United States Patent
Kim et al.

(10) Patent No.: US 11,652,501 B2
(45) Date of Patent: May 16, 2023

(54) SUPPLY MODULATOR AND WIRELESS COMMUNICATION APPARATUS INCLUDING THE SAME

(71) Applicant: SAMSUNG ELECTRONICS CO., LTD., Suwon-si (KR)

(72) Inventors: Dongsu Kim, Hwaseong-si (KR); Junsuk Bang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 17/503,632

(22) Filed: Oct. 18, 2021

(65) Prior Publication Data

US 2022/0224364 A1 Jul. 14, 2022

(30) Foreign Application Priority Data

Jan. 14, 2021 (KR) ................. 10-2021-0005395

(51) Int. Cl.
| | | |
|---|---|---|
| H04B 1/16 | (2006.01) | |
| H04B 1/18 | (2006.01) | |
| H04B 1/04 | (2006.01) | |
| H03F 1/02 | (2006.01) | |
| H03F 3/24 | (2006.01) | |

(52) U.S. Cl.
CPC ............. *H04B 1/1615* (2013.01); *H04B 1/04* (2013.01); *H04B 1/18* (2013.01); *H04B 2001/0408* (2013.01)

(58) Field of Classification Search
None
See application file for complete search history.

(56) References Cited

U.S. PATENT DOCUMENTS

| | | | |
|---|---|---|---|
| 8,432,219 B1 * | 4/2013 | Cook | H03F 3/72 330/135 |
| 8,587,271 B2 | 11/2013 | Kanbe et al. | |
| 9,479,118 B2 | 10/2016 | Khlat et al. | |
| 9,496,825 B2 | 11/2016 | Henshaw et al. | |
| 9,627,975 B2 | 4/2017 | Khlat et al. | |
| 9,755,672 B2 | 9/2017 | Perreault et al. | |
| 9,813,088 B2 * | 11/2017 | Heo | H04B 1/0475 |
| 9,954,436 B2 | 4/2018 | Khlat | |
| 10,333,477 B2 * | 6/2019 | Salem | H03F 3/72 |
| 10,644,651 B1 * | 5/2020 | Kim | H03F 3/24 |

(Continued)

OTHER PUBLICATIONS

Yevgen Barsukov, "Battery Cell Balancing—What to Balance and How", https://www.ti.com/download/trng/docs/seminar/Topic%202%20-%20Battery%20Cell%20Balancing%20-20What%20to%20Balance%20and%20How.pdf; 2009.

(Continued)

*Primary Examiner* — Pablo N Tran
(74) *Attorney, Agent, or Firm* — F. Chau & Associates, LLC

(57) ABSTRACT

Provided are a supply modulator and a wireless communication apparatus including the same. A supply modulator according to the inventive concept is driven in any one of an average power tracking mode and a discrete level envelope tracking mode to apply an output voltage to a power amplifier, and includes a multiple output voltage balancer, a switching regulator, a switching regulator controller, a switch array, a discrete-level controller, a switch controller, an output filter, and a main controller.

20 Claims, 20 Drawing Sheets

(56) References Cited

U.S. PATENT DOCUMENTS

| | | | |
|---|---|---|---|
| 2020/0259457 A1* | 8/2020 | Kim | H04W 52/0261 |
| 2021/0257971 A1* | 8/2021 | Kim | H03F 1/0227 |
| 2021/0408969 A1* | 12/2021 | Bang | H03F 3/245 |
| 2022/0224289 A1* | 7/2022 | Kim | H03F 1/0227 |

OTHER PUBLICATIONS

Battery balancing https://en.wikipedia.org/wiki/Battery_balancing, May 8, 2021.
Corrado Florian, et al., "Envelope Tracking of an RF High Power Amplifier With an 8-Level Digitally Controlled GaN-on-Si Supply Modulator", IEEE Transactions on Microwave Theory and Techniques, vol. 63, No. 8, Aug. 2015, pp. 2589-2602.

\* cited by examiner

SUPPLY MODULATOR AND WIRELESS COMMUNICATION APPARATUS INCLUDING THE SAME

CROSS-REFERENCE TO RELATED APPLICATION

This U.S. non-provisional Patent application claims priority under 35 U.S.C. § 119 to Korean Patent Application No. 10-2021-0005395, filed on Jan. 14, 2021, in the Korean Intellectual Property Office, the disclosure of which is incorporated by reference in its entirety herein.

1. TECHNICAL FIELD

The inventive concept relates to a supply modulator with improved power efficiency and a wireless communication apparatus including the supply modulator.

2. DISCUSSION OF RELATED ART

In wireless communication apparatuses such as smartphones, tablets, and Internet of Things (IoT) devices, wideband code-division multiple access (WCDMA) (3G), long term evolution (LTE), LTE advanced (4G), or new radio (NR) (5G) technology is used for high-speed communication. These apparatuses may receive power from a power amplifier supplied by a power supply. However, the efficiency of the power amplifier decreases when a high peak-to-average power ratio (PAPR) and a high bandwidth for communicating signals is needed. When the power supply of the power amplifier of a transmission end is connected to a battery, the decrease in efficiency of the power amplifier is noticeable. Accordingly, average power tracking (APT) or envelope tracking (ET) is used to improve the power efficiency of the power amplifier at a high PAPR and a high bandwidth. A chip or a component supporting APT and ET is referred to as a supply modulator (SM).

SUMMARY

At least one embodiment of the inventive concept provides a supply modulator with improved power efficiency and a wireless communication apparatus including the supply modulator.

According to an embodiment of the inventive concept, there is provided a supply modulator driven to apply an output voltage to a power amplifier. The supply modulator includes: a switching regulator, a multiple output voltage balancer, a switching regulator controller, a switch array, a discrete-level controller, and a main controller. The switching regulator operates to generate the output voltage in a discrete level envelope tracking mode or an average power tracking mode. The multiple output voltage balancer operates together with the switching regulator to generate the output voltage without receiving a power supply from an outside power source in the discrete level envelope tracking mode, and configured to equally adjust a difference between a plurality of voltages having different levels based on current received from the switching regulator and output the plurality of voltages having different levels of which the difference is equally adjusted. The switching regulator controller is configured to sense output current of the multiple output voltage balancer in the discrete level envelope tracking mode to generate a sensing value, and control the switching regulator based on the sensing value. The switch array includes a plurality of switches respectively corresponding to the plurality of voltages having different levels output from the multiple output voltage balancer, and configured to select one of the plurality of voltages having different levels and apply the selected voltage to the power amplifier. The discrete-level controller is configured to generate a level control signal based on a digital envelope signal received from outside. The switch controller is configured to receive the level control signal from the discrete-level controller, and control opening and closing operations of the plurality of switches, based on the received level control signal. The main controller is configured to select one of the average power tracking mode and the discrete level envelope tracking mode, and control at least one of the multiple output voltage balancer, the switch controller, the switching regulator controller, and the discrete-level controller, based on the selected tracking mode.

According to an embodiment of the inventive concept, there is provided a supply modulator driven to respectively apply first and second output voltages to first and second power amplifiers. The supply modulator includes: a multiple output voltage balancer, a first modulation circuit, a second modulation circuit, and a main controller. The multiple output voltage balancer operates to generate the first or second output voltage without receiving a power supply from an outside power source in a discrete level envelope tracking mode, and configured to equally adjust a difference between a plurality of voltages having different levels and output the plurality of voltages having different levels of which the difference is equally adjusted. The first modulation circuit includes a first switching regulator operating together with the multiple output voltage balancer to generate the first output voltage in the discrete level envelope tracking mode and operating to generate the first output voltage in an average power tracking mode, and configured to supply current to the multiple output voltage balancer, a first switching regulator controller configured to sense output current of the multiple output voltage balancer in the discrete level envelope tracking mode to generate a first sensing value and control the first switching regulator based on the first sensing value, a first switch array including a plurality of switches respectively corresponding to the plurality of voltages having different levels output from the multiple output voltage balancer and configured to select one of the plurality of voltages having different levels and apply the selected voltage to the first power amplifier, a first discrete-level controller configured to generate a first level control signal based on a first digital envelope signal received from outside, and a first switch controller configured to receive the first level control signal from the first discrete-level controller and control opening and closing operations of the plurality of switches, based on the received first level control signal. The second modulation circuit includes a second switching regulator operating together with the multiple output voltage balancer to generate the second output voltage in the discrete level envelope tracking mode and operating to generate the second output voltage in the average power tracking mode, and configured to supply current to the multiple output voltage balancer, a second switching regulator controller configured to sense output current of the multiple output voltage balancer in the discrete level envelope tracking mode to generate a second sensing value and control the second switching regulator based on the second sensing value, a second switch array including a plurality of switches respectively corresponding to the plurality of voltages having different levels output from the multiple output voltage balancer and configured to select one of the plurality of voltages having different levels and apply the selected voltage to the second power amplifier, a second discrete-level controller configured to generate a second level control signal based on a second digital envelope signal received from outside, and a second switch controller configured to receive the second level control signal from the second discrete-level controller and control opening and closing operations of the plurality of switches, based on the received second level control signal. The main controller is configured to select one of the average power tracking mode and the discrete level envelope tracking mode for each of the first and second power amplifiers, and control at least one of the first and second switching regulator controllers, the first and second switch controllers, the first and second discrete-level controllers, and the multiple output voltage balancer, based on the selected tracking mode.

According to an embodiment, a supply modulator includes a switching regulator, a multiple output voltage balancer, an operational transconductance amplifier, a summer, a compensation comparator, an output comparator, and a multiplexer. The switching regulator is configured to output a modulation voltage based on a control signal. The multiple output voltage balancer is configured to equally adjust a difference between a plurality of voltages having different levels based on a current received from the switching regulator and output the plurality of voltages having different levels of which the difference is equally adjusted. The operational transconductance amplifier outputs a difference value by comparing one of the output voltages with a reference voltage. The summer sums the difference value and a sensing value generated from sensing an output current of the multiple output voltage balancer to generate a compensation value. The compensation comparator receives the compensation value. The output comparator compares the modulation voltage with an average power signal from a modem. The multiplexer is configured to provide an output of the output comparator as the control signal in an average power tracking (APT) mode, and provide an output of the compensation comparator as the control signal in a discrete level envelope signal (DL-ET) mode.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described with reference to the attached drawings.

Figure 1:
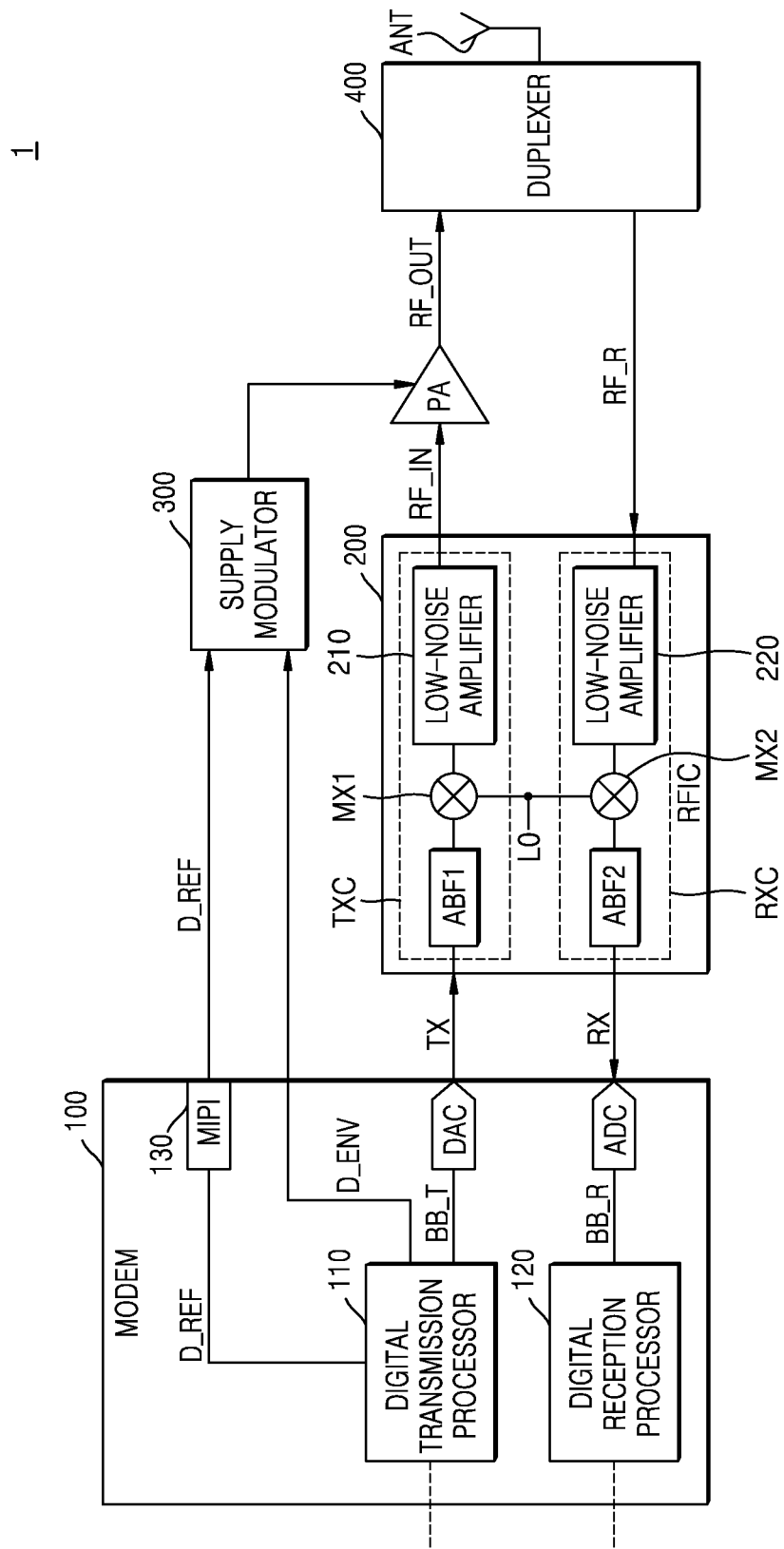
FIG. 1 is a block diagram of a wireless communication apparatus according to an embodiment of the inventive concept.
Figure 2:
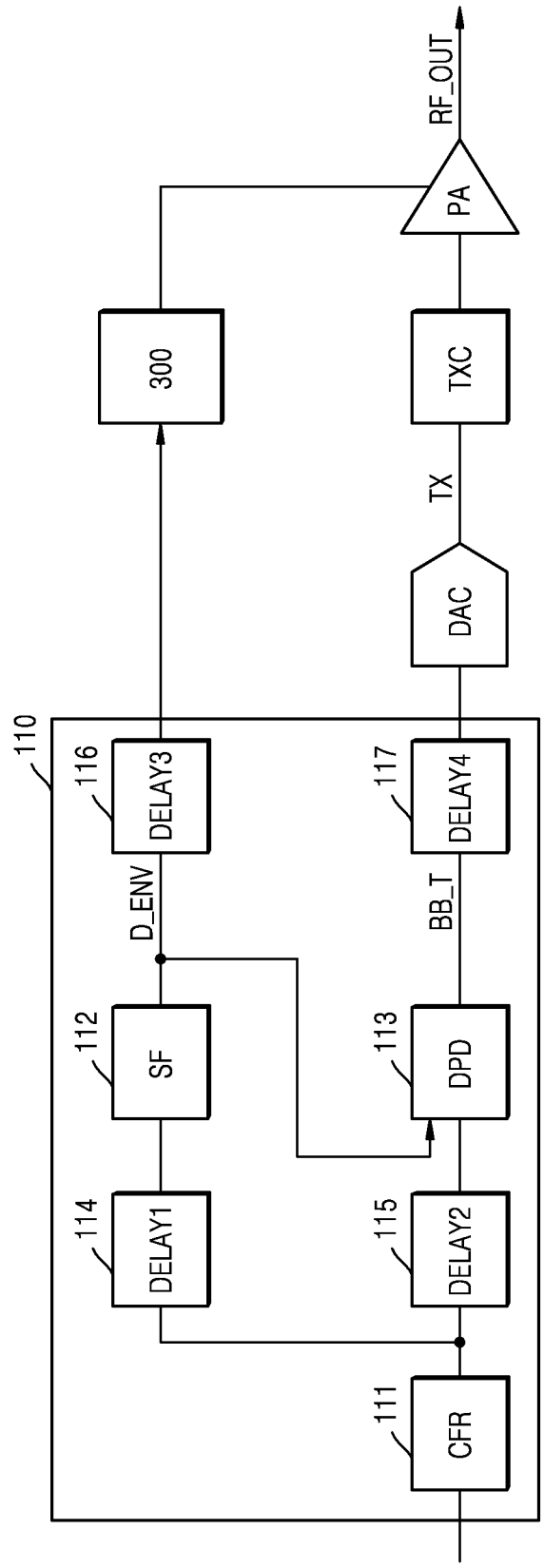
FIG. 2 is a block diagram illustrating a signal processing process of a digital transmission processor of FIG. 1.

FIG. 1 is a block diagram of a wireless communication apparatus according to an embodiment of the inventive concept. FIG. 2 is a block diagram illustrating a signal processing process of a digital transmission processor of FIG. 1.

Referring to FIG. 1, a wireless communication apparatus 1 according to an embodiment of the inventive concept includes a modem 100, a radio frequency integrated circuit (RFIC) 200, a supply modulator 300, a duplexer 400, a power amplifier PA, and an antenna ANT.

The modem 100 may include the digital transmission processor 110, a digital reception processor 120, a digital-to-analog converter DAC, an analog-to-digital converter ADC, and a mobile industry processor interface (MIPI) 130.

The modem 100 may process a baseband signal BB_T (e.g., including an I signal and a Q signal) including information to be transmitted through the digital transmission processor 110 according to a certain communication method. Also, the modem 100 may process a received baseband signal BB_R through the digital reception processor 120 according to a certain communication method. For example, the modem 100 may process a signal to be transmitted or a received signal according to a communication method such as orthogonal frequency division multiplexing (OFDM), orthogonal frequency division multiple access (OFDMA), wideband code multiple access (WCDMA), or high speed packet access (HSPA+). In addition, the modem 100 may process the baseband signal BB_T or the baseband signal BB_R according to various types of communication methods (i.e., various communication methods to which a technique for modulating or demodulating an amplitude and/or a frequency of the baseband signal BB_T or BB_R is applied).

The modem 100 may extract an envelope of the baseband signal BB_T through the digital transmission processor 110 and generate a digital envelope signal D_ENV based on the extracted envelope. Herein, the extracted envelope may correspond to an amplitude component (i.e., magnitudes of the I signal and the Q signal) of the baseband signal BB_T. Also, the modem 100 may generate an average power signal D_REF based on an average power tracking table (i.e., an APT table) stored in a memory 2200 (see FIG. 20).

For reference, in the APT table, information of a power supply voltage of the power amplifier PA according to an expected output power (or transmission power) of the antenna ANT may be stored, and average power signal information corresponding to the power supply voltage of the power amplifier PA may be stored. Accordingly, when the expected output power of the antenna ANT is determined, the modem 100 may generate the average power signal D_REF by using the APT table and may apply the generated average power signal D_REF to the supply modulator 300 as a reference voltage signal.

Herein, referring to FIG. 2, a detailed signal processing operation of the digital transmission processor 110 is shown.

In detail, in addition to the above-described baseband signal processing operation, the envelope extraction operation, and the digital envelope signal generation operation, the digital transmission processor 110 may perform various operations through a crest factor reduction (CFR) 111, a shaping function (SF) 112, a digital pre-distortion (DPD) 113, a DELAY1 114, a DELAY2 115, a DELAY3 116, and a DELAY4 117.

The CFR 111 may reduce a peak-to average power ratio (PAPR) of a communication signal (e.g., the baseband signal BB_T). Also, to improve the efficiency and linearity of the power amplifier PA, the SF 112 may transform the digital envelope signal D_ENV. Also, the digital envelope signal D_ENV transformed by the SF 112 may be applied to the DPD 113 and the DELAY3 116. The DPD 113 may compensate for and linearize distortion of the power amplifier PA in a digital region. For reference, in an average power tracking mode, a value of the DPD 113 may vary according to a power supply voltage applied to the power amplifier PA, and in a discrete level envelope tracking mode, a value of the DPD 113 may vary according to an output value of the SF 112. Also, the DELAY1 114 and the DELAY2 115 may correct a delay of an output signal of the CFR 111, the DELAY3 116 may correct a delay of the digital envelope signal D_ENV, and the DELAY4 117 may correct a delay of the baseband signal BB_T.

The digital transmission processor 110 having such a structure may output the digital envelope signal D_ENV and the baseband signal BB_T.

The digital envelope signal D_ENV may be directly applied to the supply modulator 300 without digital/analog conversion. The baseband signal BB_T may be converted into a transmission signal TX through the digital-to-analog converter DAC and may be applied to a transmission circuit TXC.

For reference, the digital envelope signal D_ENV may be converted into an analog envelope signal through a digital-to-analog converter and may be applied to the supply modulator 300. However, an embodiment of the inventive concept will be described assuming that the digital envelope signal D_ENV is directly applied to the supply modulator 300 without digital/analog conversion.

Furthermore, although not shown in FIG. 2, the digital transmission processor 110 may further include an internal component for processing the above-described operations (i.e., baseband signal processing, envelope extraction, and digital envelope signal generation). Also, the internal components of the digital transmission processor 110 of FIG. 2 are merely examples, and the inventive concept is not limited thereto.

Referring back to FIG. 1, the modem 100 may perform digital to analog conversion on the baseband signal BB_T using the digital-to-analog converter DAC to generate a transmission signal TX that is an analog signal. Also, the average power signal D_REF output from the modem 100 may be a digital signal. The average power signal D_REF may be applied to the supply modulator 300 through the MIPI 130. A digital-to-analog converter included in the supply modulator 300 may convert the average power signal D_REF into an analog signal (e.g., a reference voltage signal). In an embodiment, the digital-to-analog converter DAC operates at a higher speed than the digital-to-analog converter included in the supply modulator 300.

However, the inventive concept is not limited thereto, and the modem 100 may convert the average power signal D_REF into an analog signal through the digital-to-analog converter therein and may output the analog signal. In this case, the modem 100 may apply an average power signal, which has been converted into an analog signal, to the supply modulator 300 as a reference voltage signal.

However, for convenience of explanation, an embodiment of the inventive concept will be described assuming that the modem 100 applies the average power signal D_REF to the digital-to-analog converter included in the supply modulator 300 through the MIPI 130.

For reference, the transmission signal TX may be a differential signal including a positive signal and a negative signal.

The modem 100 may receive a reception signal RX, which is an analog signal, from the RFIC 200. Also, the modem 100 may perform analog to digital conversion on the reception signal RX through the analog-to-digital converter ADC provided therein and may extract the baseband signal BB_R that is a digital signal. Herein, the reception signal RX may be a differential signal including a positive signal and a negative signal.

The RFIC 200 may generate a radio frequency (RF) input signal RF_IN by performing frequency up-conversion on the transmission signal TX, or may generate the reception signal RX by performing frequency down-conversion on a RF reception signal RF_R.

In detail, the RFIC 200 may include the transmission circuit TXC for frequency up-conversion, a reception circuit RXC for frequency down-conversion, and a local oscillator LO.

Herein, the transmission circuit TXC may include a first analog baseband filter ABF1, a first mixer MX1, and an amplifier 210. For example, the first analog baseband filter ABF1 may include a low-pass filter.

The first analog baseband filter ABF1 may filter the transmission signal TX received from the modem 100 and may apply the transmission signal TX to the first mixer MX1. Also, the first mixer MX1 may perform the frequency up-conversion of converting a frequency of the transmission signal TX from a baseband into a high-frequency band through a frequency signal applied by the local oscillator LO. Through the frequency up-conversion, the transmission signal TX may be applied to the amplifier 210 as the RF input signal RF_IN, and the amplifier 210 may primarily amplify power of the RF input signal RF_IN and may apply the RF input signal RF_IN to the power amplifier PA.

The power amplifier PA may receive a power supply voltage (i.e., an output voltage that dynamically varies) from the supply modulator 300, and may further amplify power of the RF input signal RF_IN to generate an RF output signal RF_OUT. Also, the power amplifier PA may apply the generated RF output signal RF_OUT to the duplexer 400.

The reception circuit RXC may include a second analog baseband filter ABF2, a second mixer MX2, and a low-noise amplifier 220. For example, the second analog baseband filter ABF2 may include a low-pass filter.

The low-noise amplifier 220 may amplify the RF reception signal RF_R received from the duplexer 400 and may apply the RF reception signal RF_R to the second mixer MX2. Also, the second mixer MX2 may perform the frequency down-conversion of converting a frequency of the RF reception signal RF_R from a high-frequency baseband into a baseband through a frequency signal applied by the local oscillator LO. Through the frequency down-conversion, the RF reception signal RF_R may be applied to the second analog baseband filter ABF2 as the reception signal RX. The second analog baseband filter ABF2 may filter the reception signal RX and may apply the filtered reception signal RX to the modem 100.

For reference, the wireless communication apparatus 1 may transmit and receive signals through a plurality of frequency bands by using carrier aggregation (CA). Also, to this end, the wireless communication apparatus 1 may also include a plurality of power amplifiers for amplifying power of a plurality of RF input signals respectively corresponding to a plurality of carrier waves. However, for convenience of explanation, an embodiment of the inventive concept will be described assuming that there is one power amplifier PA.

In an embodiment, the supply modulator 300 generates an output voltage whose level dynamically varies based on the digital envelope signal D_ENV and the average power signal D_REF, and applies the output voltage to the power amplifier PA as a power supply voltage.

In detail, the supply modulator 300 may receive the average power signal D_REF and the digital envelope signal D_ENV from the modem 100. Also, the supply modulator 300 may be, based on the received average power signal D_REF and the digital envelope signal D_ENV, driven in any one of an average power tracking (APT) mode and a discrete level envelope tracking (DL-ET) mode and may generate an output voltage that dynamically varies. Also, the supply modulator 300 may apply the generated output voltage to the power amplifier PA as a power supply voltage.

When the supply modulator 300 receives an analog envelope signal (an analog signal obtained by performing digital to analog conversion on the digital envelope signal D_ENV) from the modem 100, the supply modulator 300 may be driven in a continuous level envelope tracking (CL-ET) mode based on the analog envelope signal and may generate an output voltage that dynamically varies. However, an embodiment of the inventive concept will be described assuming that the supply modulator 300 is driven in any one of the APT mode and the DL-ET mode.

The supply modulator 300 may receive the digital envelope signal D_ENV from the modem 100 when driven in the DL-ET mode. Also, the supply modulator 300 may receive the average power signal D_REF from the modem 100 when updating an average power signal in an internal register (not shown).

The supply modulator 300 may receive each of the digital envelope signal D_ENV and the average power signal D_REF at a time other than the above-described time. However, for convenience of explanation, an embodiment of the inventive concept will be described assuming that the supply modulator 300 receives each of the digital envelope signal D_ENV and the average power signal D_REF at the above-described time.

For reference, when a power supply voltage having a fixed level or a constant level is applied to the power amplifier PA, the power efficiency of the power amplifier PA decreases. Accordingly, for efficient power management of the power amplifier PA, the power amplifier PA may modulate an input voltage (i.e., power supplied by a battery or the like, e.g., VIN of FIG. 4) based on at least one of the digital envelope signal D_ENV and the average power signal D_REF, and may apply the modulated voltage to the power amplifier PA as a power supply voltage.

The supply modulator 300 according to an embodiment of the inventive concept is capable of being driven in any one of two tracking modes (the APT mode and the DL-ET mode) by considering power conversion efficiency and performance.

In particular, the supply modulator 300 according to an embodiment of the inventive concept may separately include a switching regulator for supplying current of a low-frequency component and a multiple output voltage balancer for supplying current of a high-frequency component. Accordingly, the supply modulator 300 according to an embodiment of the inventive concept may reduce the magnitude of current flowing through a switch array when driven in the DL-ET mode, and thus, heat loss (i.e., power loss) due to a resistance component of a switch may be reduced and a size of the switch array may also be reduced.

Also, because the supply modulator 300 includes a multiple output voltage balancer with no power source instead of a multiple output voltage regulator, various components (e.g., an inductor and a switch) necessary to provide the power source are not required.

In contrast, a supply modulator using a multiple output voltage regulator (including a power source) has a problem in that, in a DL-ET mode, because any one of a plurality of voltages having different levels generated by the multiple output voltage regulator passes through a switch and is provided as an output voltage (i.e., output current) to the power amplifier PA, heat loss (i.e., power loss) occurs due to a resistance component of the switch while the output current passes through the switch.

When a size of the switch (i.e., a size of a transistor) increases, the gate capacitance of the switch also increases. Accordingly, power loss generated due to charge and discharge of a gate capacitor of the switch also increases.

In addition, when the multiple output voltage regulator is applied to a supply modulator, various components (e.g., an inductor and a switch) are required to provide the power source for the multiple output voltage regulator, and a circuit board area having a certain size or more needs to be secured to arrange the various components.

However, in the supply modulator 300 according to an embodiment of the inventive concept, as described above, current of a low-frequency component (i.e., current of a high output) may be supplied through a switching regulator and current of a high-frequency component (i.e., current of a low output) may be supplied through a multiple output voltage balancer. Accordingly, the magnitude of current flowing through a switch (i.e., current output from the multiple output voltage balancer and passing through the switch) may be reduced compared to when the multiple output voltage regulator is applied to the supply modulator. Further, heat loss (i.e., power loss) due to a resistance component of the switch may also be reduced compared to when the multiple output voltage regulator is applied to the supply modulator.

Also, in the supply modulator 300 according to an embodiment of the inventive concept, because there is no need to increase a size of a switch to reduce heat loss (i.e., power loss) due to a resistance component of the switch, a size of a switch array may be reduced. Furthermore, in the supply modulator 300 according to an embodiment of the inventive concept, because heat loss (i.e., power loss) due to a resistance component of a switch is reduced, power efficiency may also be improved.

In the supply modulator 300 according to an embodiment of the inventive concept, because a multiple output voltage balancer with no power source instead of a multiple output voltage regulator is provided, various components (e.g., an inductor and a switch) necessary to provide the power source are not required, and thus a circuit board area may be reduced. Furthermore, in the supply modulator 300 according to an embodiment of the inventive concept, because a circuit board area is reduced, a product size may also be reduced.

The supply modulator 300 will be described below in more detail.

The duplexer 400 may be connected to the antenna ANT and may separate a transmission frequency from a reception frequency. In detail, the duplexer 400 may separate the RF output signal RF_OUT received from the power amplifier PA for each frequency band and may apply the RF output signal RF_OUT to a corresponding antenna ANT. Also, the duplexer 400 may apply an external signal received from the antenna ANT to the low-noise filter 220 of the reception circuit RXC. For example, the duplexer 400 may include a front end module with integrated duplexer (FEMiD).

The antenna ANT may transmit the RF output signal RF_OUT which is frequency-separated by the duplexer 400 to the outside or may apply the RF reception signal RF_R received from the outside to the duplexer 400. For example, the antenna ANT may include, but is not limited to, an array antenna. For example, the array antenna may include a different antenna for each frequency band.

For reference, the modem 100, the supply modulator 300, the RFIC 200, the power amplifier PA, and the duplexer 400 may each be individually implemented as an integrated circuit (IC), a chip, or a module. Also, the modem 100, the supply modulator 300, the RFIC 200, the power amplifier PA, and the duplexer 400 may be mounted together on a printed circuit board (PCB). However, the inventive concept is not limited thereto. In an embodiment, at least some of the modem 100, the supply modulator 300, the RFIC 200, the power amplifier PA, and the duplexer 400 is implemented as a single communication chip.

Furthermore, the wireless communication apparatus 1 of FIG. 1 may be included in a wireless communication system using a cellular network such as new radio interface and radio access technology (NR), Long-Term Evolution (LTE), or LTE-Advanced, or may be included in a wireless local area network (WLAN) system such as wireless fidelity (WiFi) or any other wireless communication systems. For reference, the structure of the wireless communication apparatus 1 of FIG. 1 is merely an example and the inventive concept is not limited thereto. For example, the wireless communication apparatus 1 may be configured in various ways according to a communication protocol or a communication method.

Figure 3:
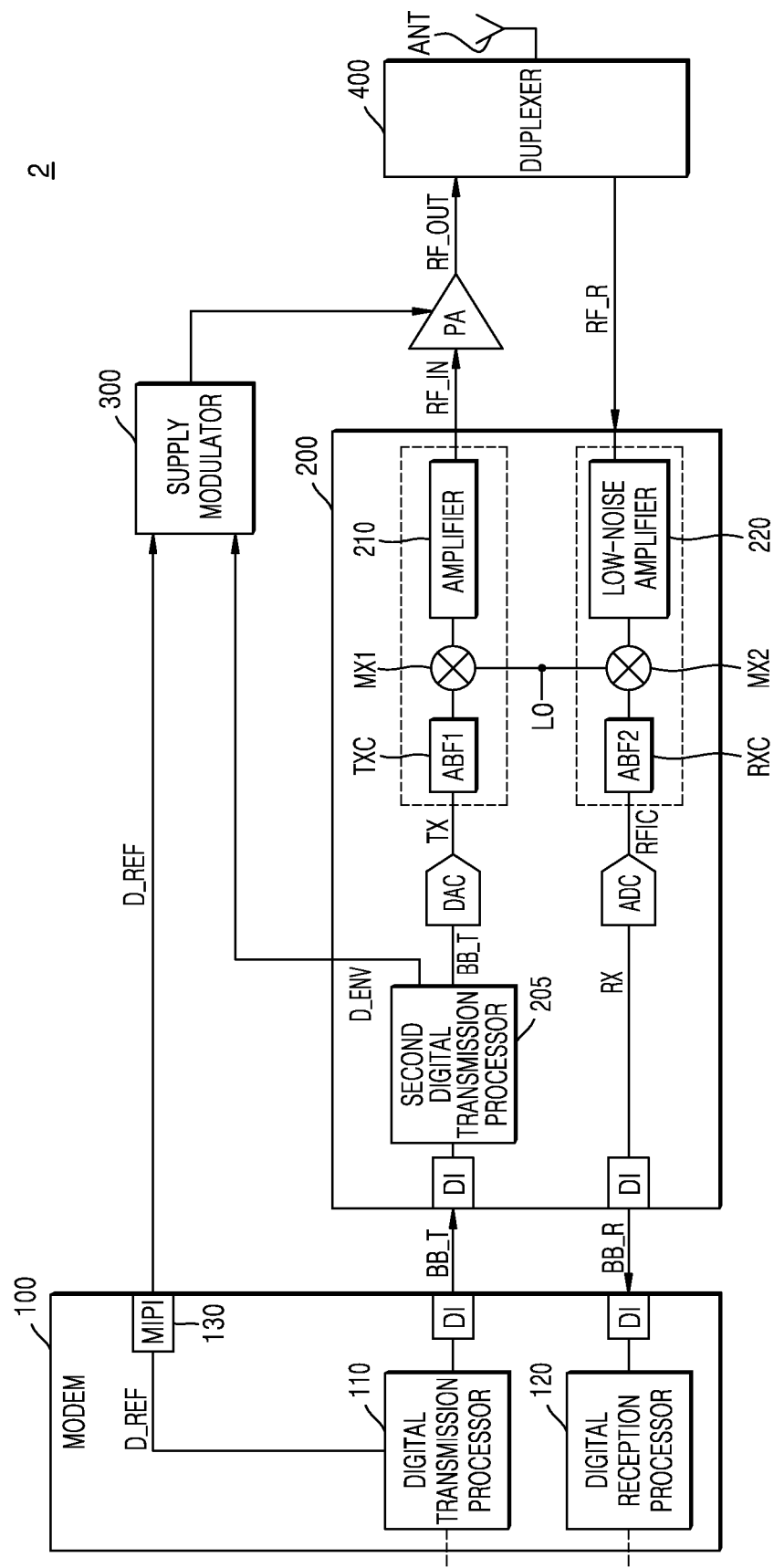
FIG. 3 is a block diagram of a wireless communication apparatus according to an embodiment of the inventive concept.

FIG. 3 is a block diagram of a wireless communication apparatus according to an embodiment of the inventive concept.

A wireless communication apparatus 2 has the same structure, function, and effect as those of the wireless communication apparatus 1 of FIG. 1 except for content related to the digital envelope signal D_ENV, and thus the following will mainly focus on this content difference.

Referring to FIG. 3, the wireless communication apparatus 2 according to an embodiment of the inventive concept includes the modem 100, the RFIC 200, the supply modulator 300, the duplexer 400, the power amplifier PA, and the antenna ANT.

The modem 100 may process, through a first digital transmission processor 110, the baseband signal BB_T according to a pre-determined communication method. Also, the modem 100 may apply, through a digital interface DI, the processed baseband signal BB_T to the RFIC 200. Also, the modem 100 may generate the average power signal D_REF based on an average power tracking table (i.e., the APT table) stored in the memory 2200 (see FIG. 20).

The average power signal D_REF may be applied to the supply modulator 300 as a reference voltage signal. That is, the average power signal D_REF output from the modem 100 may be a digital signal. Accordingly, the average power signal D_REF may be applied to a digital-to-analog converter included in the supply modulator 300 through the MIPI 130, and may be converted into an analog signal (e.g., a reference voltage signal) through the digital-to-analog converter included in the supply modulator 300. In an embodiment, a digital-to-analog converter DAC included in the RFIC 200 operates at a higher speed than the digital-to-analog converter included in the supply modulator 300.

The RFIC 200 may receive, through the digital interface DI, the baseband signal BB_T from the modem 100, and the baseband signal BB_T may be applied to a second digital transmission processor 205 inside the RFIC 200. The second digital transmission processor 205 may extract an envelope of the baseband signal BB_T, and may generate and output the digital envelope signal D_ENV based on the extracted envelope. In an embodiment, the second digital transmission processor 205 directly outputs the baseband signal BB_T received through the digital interface DI.

The baseband signal BB_T output from the second digital transmission processor 205 may be applied to the digital-to-analog converter DAC inside the RFIC 200. The digital-to-analog converter DAC may perform digital to analog conversion on the baseband signal BB_T to generate the transmission signal TX that is an analog signal, and the generated transmission signal TX may be applied to the transmission circuit TXC therein.

Also, the digital envelope signal D_ENV output from the second digital transmission processor 205 may be directly applied to the supply modulator 300 without passing through a digital-to-analog converter. For reference, the digital envelope signal D_ENV may be converted into an analog envelope signal through a digital-to-analog converter and may be applied to the supply modulator 300. However, an embodiment of the inventive concept will be described assuming that the digital envelope signal D_ENV is directly applied to the supply modulator 300 without digital to analog conversion.

The RFIC 200 may generate the RF input signal RF_IN by performing frequency up-conversion on the transmission signal TX through the transmission circuit TXC, and may apply the digital envelope signal D_ENV to the supply modulator 300.

In an embodiment, the supply modulator 300 generates a voltage whose level dynamically varies based on the digital envelope signal D_ENV and the average power signal D_REF, and applies the voltage to the power amplifier PA as a power supply voltage.

In detail, the supply modulator 300 may receive the average power signal D_REF from the modem 100 and may receive the digital envelope signal D_ENV from the RFIC 200. Also, the supply modulator 300 may be driven in any one of two tracking modes (the APT mode and the DL-ET mode) based on the received average power signal D_REF and the digital envelope signal D_ENV and may generate an output voltage that dynamically varies. Also, the supply modulator 300 may apply the generated output voltage to the power amplifier PA as a power supply voltage.

When the supply modulator 300 receives an analog envelope signal (an analog signal obtained by performing digital to analog conversion on the digital envelope signal D_ENV) from the modem 100, the supply modulator 300 may be driven in a continuous level envelope tracking (CL-ET) mode based on the analog envelope signal and may generate an output voltage that dynamically varies. However, an embodiment of the inventive concept will be described assuming that the supply modulator 300 is driven in any one of the APT mode and the DL-ET mode.

The supply modulator 300 may receive the digital envelope signal D_ENV from the RFIC 200 when driven in the DL-ET mode. Also, the supply modulator 300 may receive the average power signal D_REF from the modem 100 when updating an average power signal in an internal register (not shown).

The supply modulator 300 may receive each of the digital envelope signal D_ENV and the average power signal D_REF at a time other than the above-described time. However, for convenience of explanation, an embodiment of the inventive concept will be described assuming that the supply modulator 300 receives each of the digital envelope signal D_ENV and the average power signal D_REF at the above-described time.

For reference, the structure of the wireless communication apparatus 2 of FIG. 3 is merely an example and the inventive concept is not limited thereto. For example, the wireless communication apparatus 2 may be configured in various ways according to a communication protocol or a communication method.

As described above, because the wireless communication apparatuses 1 and 2 according to some embodiments of the inventive concept have the above-described structures and characteristics, an example of a supply modulator included in each of the wireless communication apparatuses 1 and 2 according to some embodiments of the inventive concept will be described with reference to FIGS. 4 to 16.

Figure 4:
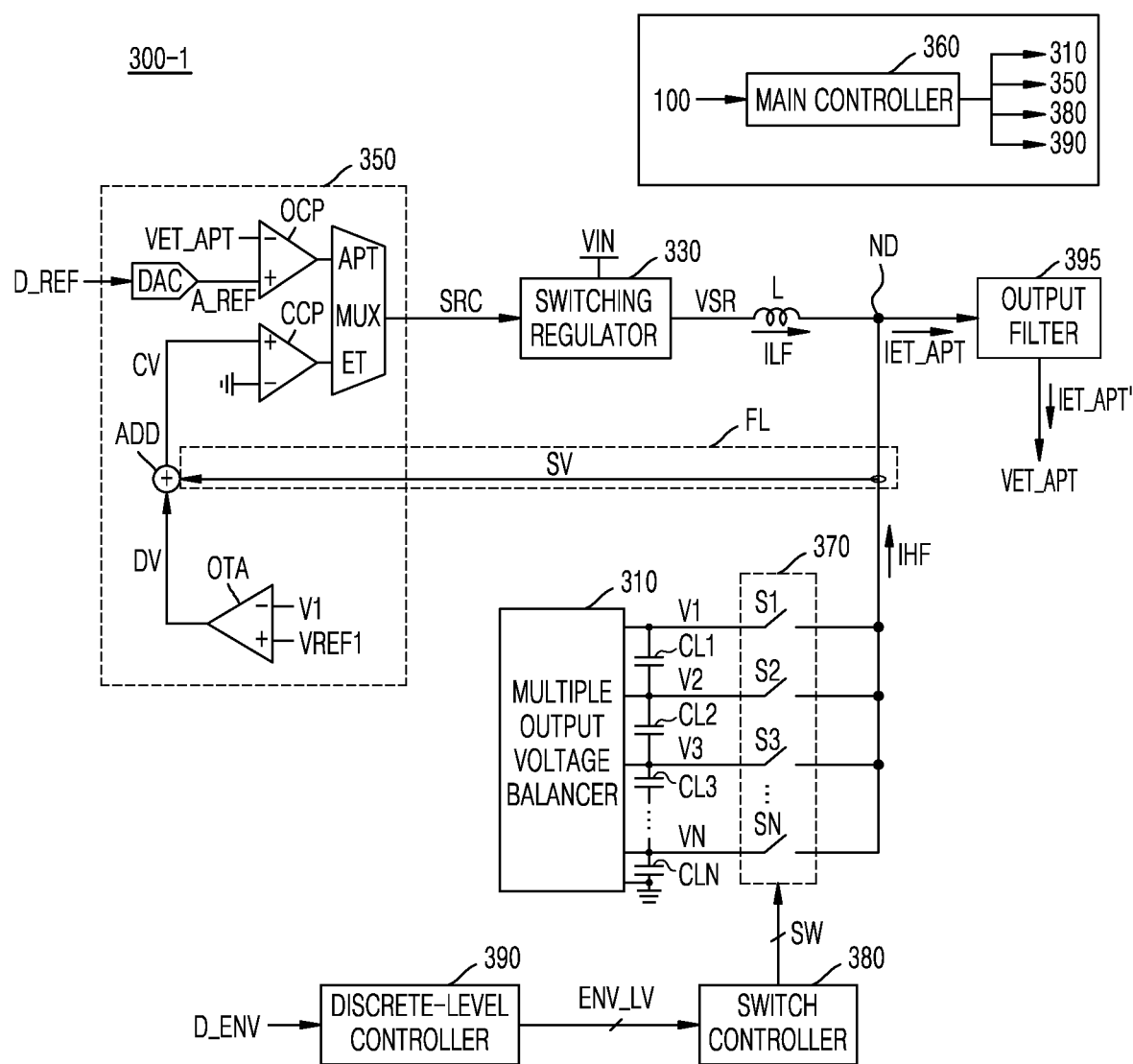
FIG. 4 is a circuit diagram illustrating an example of a supply modulator included in a wireless communication apparatus, according to an embodiment of the inventive concept.
Figure 13:
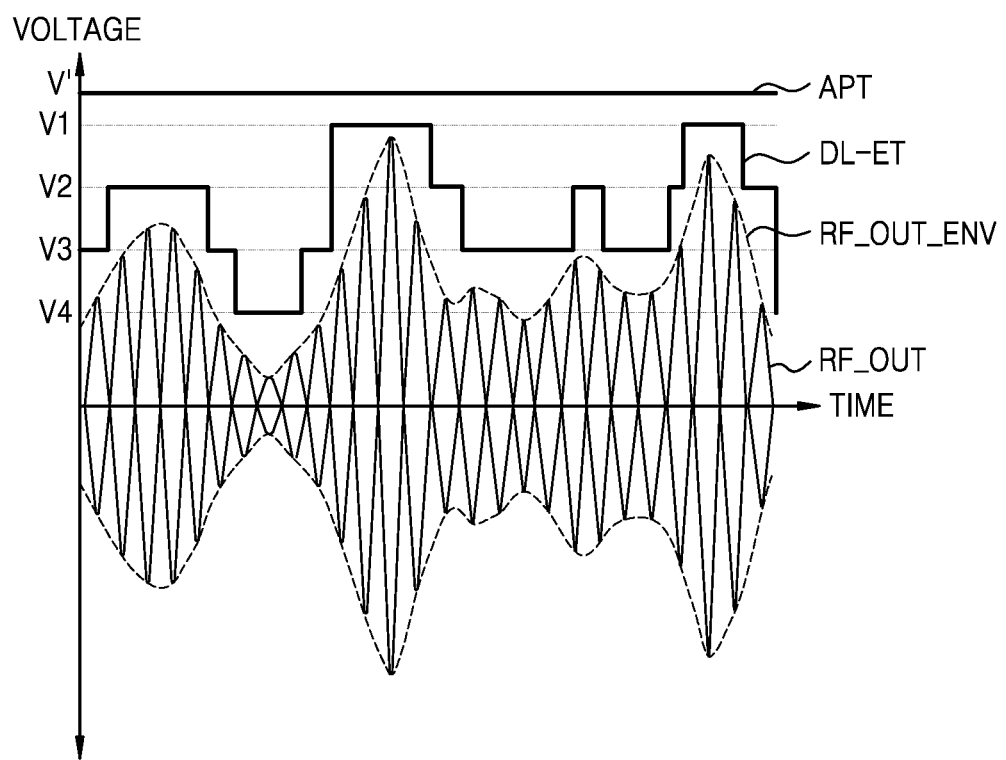
FIG. 13 is a graph illustrating waveform characteristics of an output voltage according to a tracking mode.
Figure 14:
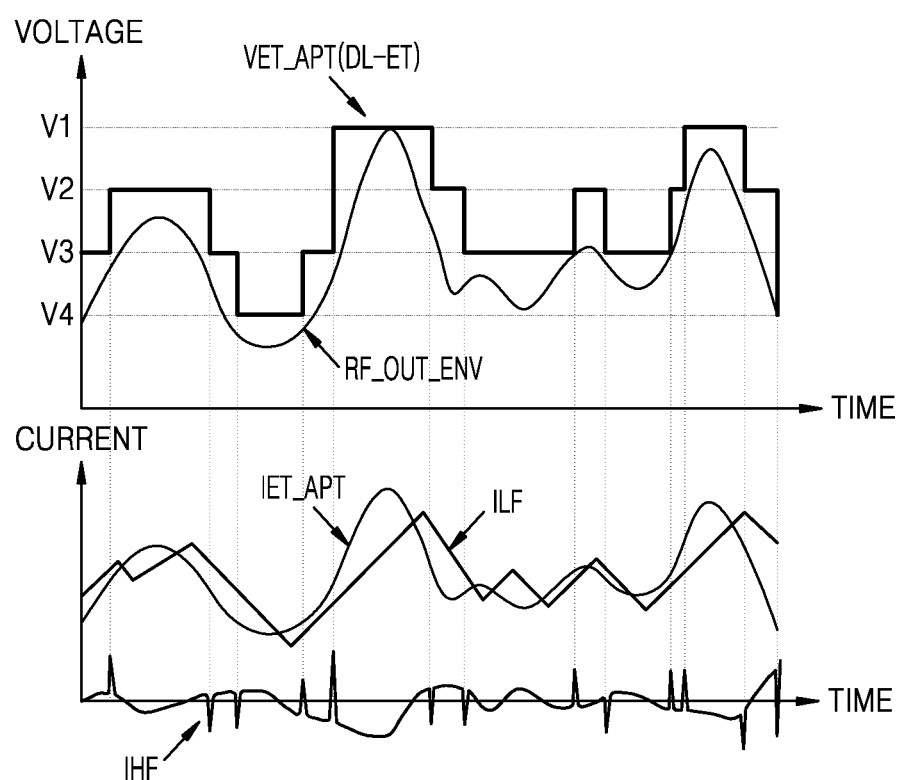
FIGS. 14 through 16 are graphs illustrating an output voltage generation mechanism in a discrete level envelope tracking mode.
Figure 15:
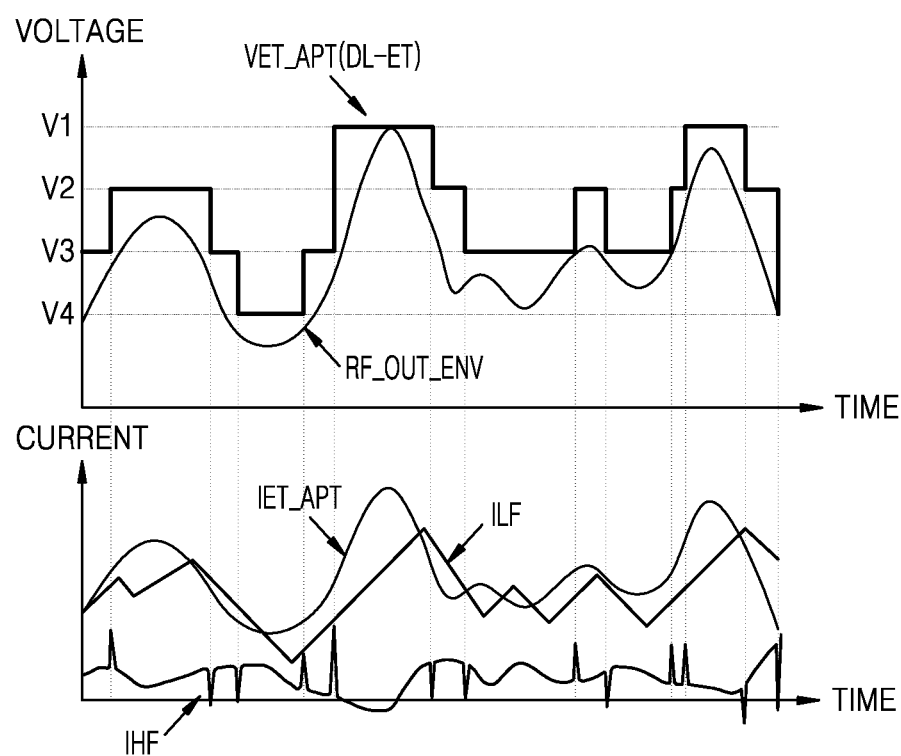
Figure 16:
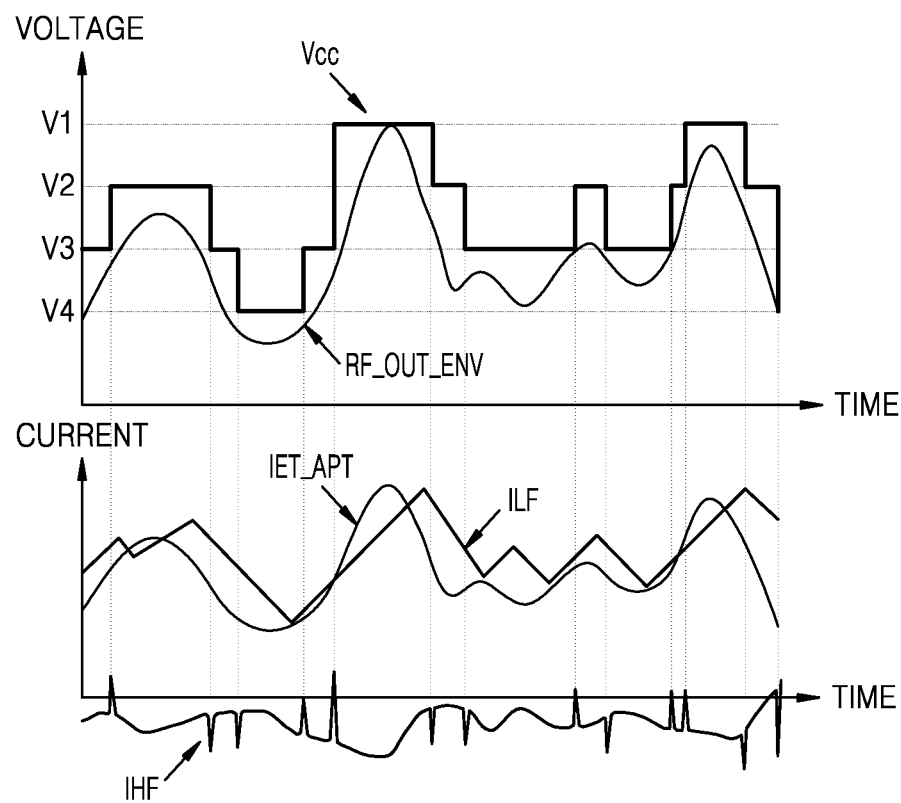

FIG. 4 is a circuit diagram illustrating an example of a supply modulator included in a wireless communication apparatus, according to an embodiment of the inventive concept. FIGS. 5 through 12 are diagrams illustrating some examples of a multiple output voltage balancer of FIG. 4, according to an embodiment of the inventive concept. FIG. 13 is a graph illustrating waveform characteristics of an output voltage according to a tracking mode. FIGS. 14 through 16 are graphs illustrating an output voltage generation mechanism in a discrete level envelope tracking mode.

For convenience of explanation, the following will be described assuming that a supply modulator 300-1 is implemented as the supply modulator 300 of the wireless communication apparatus 1 of FIG. 1. Also, FIG. 4 will be described with reference to FIG. 1.

Referring to FIG. 4, the supply modulator 300-1 according to an embodiment of the inventive concept includes a multiple output voltage balancer 310 (e.g., a multiple output voltage balancer circuit), a switching regulator 330, a switching regulator controller 350 (e.g., a switching regulator control circuit), a main controller 360 (e.g., a main controller circuit), a switch array 370, a switch controller 380 (e.g., a switch controller circuit), and a discrete-level controller 390 (e.g., a discrete-level controller circuit).

For reference, each component may include a component-dedicated controller (e.g., the switching regulator controller 350) therein or outside, and each dedicated controller may be controlled by the main controller 360. Also, there may be a controller that integrates and controls at least two components, and the corresponding controller may be controlled by the main controller 360.

However, for convenience of explanation, only dedicated controllers for some components will be described in detail below.

The supply modulator 300-1 may further include an output filter 395 for removing noise from an output voltage VET_APT applied to the power amplifier PA. Accordingly, the output filter 395 may generate IET_APT' by removing noise from IET_APT that is sum current of ILF and IHF described below. An output voltage VET_APT from which noise is removed by the generated IET_APT' may be applied to the power amplifier PA.

A position of the output filter 395 may be changed. For example, the output filter 395 may be located at a position shown in FIG. 4 (e.g., between an output end of the supply modulator 300-1 and a node (e.g., a node ND) between the switch array 370 and an output end of the switching regulator 330). Also, although not shown in FIG. 4, the output filter 395 may be located between the switch array 370 and the node ND.

A connection position of the output end of the switching regulator 330 may also vary according to the position of the output filter 395. For example, as shown in FIG. 4, the output end of the switching regulator 330 may be connected to the node ND between the switch array 370 and the output filter 395.

Also, although not shown in FIG. 4, when the output filter 395 is located between the switch array 370 and the node ND, the output end of the switching regulator 330 may be connected between the output filter 395 and the power amplifier PA (i.e., between the output filter 395 and the output end of the supply modulator 300-1).

For reference, when the output filter 395 is located between the switch array 370 and the node ND (i.e., when the output end of the switching regulator 330 is connected between the output filter 395 and the output end of the supply modulator 300-1), output current of the switching regulator 330 is supplied to the power amplifier PA without passing through the output filter 395, and thus power loss due to the output filter 395 may be prevented.

Also, the output filter 395 may include, for example, but is not limited to, a low-pass filter.

According to an embodiment, the supply modulator 300-1 does not include the output filter 395.

However, for convenience of explanation, the following will be described assuming that the supply modulator 300-1 includes the output filter 395, and the output filter 395 is located at a position shown in FIG. 4 (i.e., between the node ND and the output end of the supply modulator 300-1).

The multiple output voltage balancer 310 may operate together with the switching regulator 330 to generate the output voltage VET_APT without receiving a power supply from an outside power source in a DL-ET mode, and may equally adjust a difference between a plurality of voltages V1 through VN having different levels (where N is a natural number equal to or greater than 2, V1 is a lowest level voltage, and VN is a highest level voltage) based on current supplied from the switching regulator 330 and may output the plurality of voltages V1 through VN having different levels of which the difference is equally adjusted. Also, the multiple output voltage balancer 310 may be controlled by the main controller 360.

That is, because the multiple output voltage balancer 310 is connected in parallel with the switching regulator 330, the multiple output voltage balancer 310 may generate the output voltage VET_APT by operating in parallel with the switching regulator 330 in the DL-ET mode.

For reference, because the multiple output voltage balancer 310 does not receive separate power from a voltage source unlike a multiple output voltage regulator, the multiple output voltage balancer 310 need not perform an operation of generating a plurality of voltages having different levels by boosting or reducing an input voltage applied from the voltage source (e.g., power supplied from a battery or the like). That is, the multiple output voltage balancer 310 may be able to output the plurality of voltages V1 through VN having different levels, but need not be able to directly generate the plurality of voltages V1 through VN having different levels.

The plurality of voltages V1 through VN having different levels may be adjusted through an ILF boosting and reducing mechanism of the switching regulator 330 described below. An absolute value of V1 that is the highest level voltage may be generated and adjusted through the ILF boosting and reducing mechanism of the switching regulator 330 described below, and a difference between the plurality of voltages V1 through VN having different levels may be equally adjusted and output based on the absolute value of V1 generated and adjusted by the switching regulator 330.

That is, the multiple output voltage balancer 310 may receive current from the switching regulator 330 to output the plurality of voltages V1 through VN having different levels, and may equally adjust a voltage applied to each of a plurality of load capacitors CL1 through CLN (where N is a natural number equal to or greater than 2) provided therein based on the received current. Accordingly, a voltage applied to each load capacitor (i.e., a difference between the plurality of voltages V1 through VN having different levels) may be equally adjusted. Thus the plurality of voltages V1 through VN having different levels of which the difference is equally adjusted may be output from the multiple output voltage balancer 310. Also, the multiple output voltage balancer 310 may output or absorb current (IHF described below), in order to adjust a sum of voltages applied to the plurality of load capacitors CL1 through CLN therein to V1.

For reference, in an initial operation of the supply modulator 300-1, the plurality of load capacitors CL1 through CLN may be previously charged to a voltage having a certain level or more due to the current output from the switching regulator 330. Next, through the ILF boosting and reducing mechanism of the switching regulator 330, the multiple output voltage balancer 310 may adjust and output the plurality of voltages V1 through VN having different levels.

Also, in multiple output voltage balancers 310-5 through 310-8 of FIGS. 9 through 12 described below, a voltage applied to some of the plurality of load capacitors CL1 through CLN may be different from a voltage applied to the remaining load capacitors (i.e., voltages applied to the load capacitors CL1 through CLN may be unequal), which will be described below in detail.

A mechanism by which the multiple output voltage balancer 310 equally adjusts a difference between the plurality of voltages V1 through VN having different levels and a mechanism by which the multiple output voltage balancer 310 outputs or absorbs current (IHF described below) will be described below in more detail.

Connection between the multiple output voltage balancer 310 and the power amplifier PA may be selectively opened and closed by the switch array a. That is, any one of the plurality of voltages V1 through VN having different levels output from the multiple output voltage balancer 310 may be selected through an opening and closing operation of the switch array 370, and the selected voltage may be applied to the power amplifier PA.

An output end of the multiple output voltage balancer 310 may include the plurality of load capacitors CL1 through CLN each corresponding to a difference between the plurality of voltages V1 through VN having different levels. Also, connections between the power amplifier PA and the plurality of load capacitors CL1 through CLN may be individually opened and closed by a plurality of switches S1 through SN (where N is a natural number equal to or greater than 2) in the switch array 370.

For reference, although the plurality of load capacitors CL1 through CLN are provided outside the multiple output voltage balancer 310 in FIG. 4, the plurality of load capacitors CL1 through CLN may be provided inside the multiple output voltage balancer 310.

The plurality of load capacitors CL1 through CLN provided in the multiple output voltage balancer 310 may be stacked (i.e., the plurality of load capacitors CL1 through CLN are connected in series to a common ground voltage) as shown in FIG. 4, but the inventive concept is not limited thereto. That is, each of the plurality of load capacitors CL1 through CLN may be independently connected to a ground voltage.

However, for convenience of explanation, an embodiment of the inventive concept will be described assuming that the plurality of load capacitors CL1 through CLN are stacked.

Referring to FIGS. 5 through 12, various examples of the multiple output voltage balancer 310 (i.e., multiple output voltage balancers 310-1 through 310-8) are shown. For reference, although there may be a various number of voltages V1 through VN having different levels output from the multiple output voltage balancer 310, for convenience of explanation, the following will be described assuming that in each of the multiple output voltage balancers 310-1 through 310-8, the number of the plurality of voltages V1 through VN having different levels is 4 (V1 through V4), 3 (V1 through V3), or 5 (V1 through V5).

Figure 5:
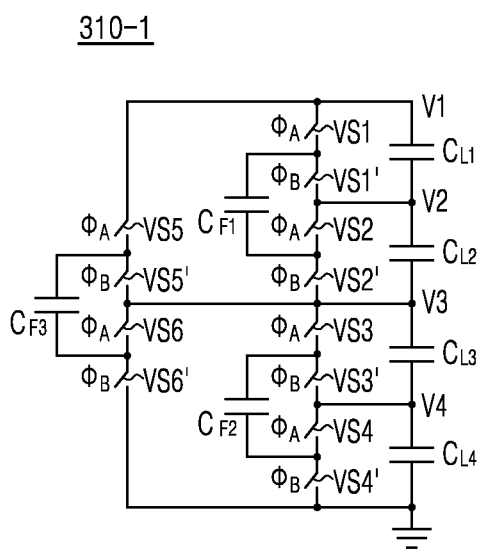
FIGS. 5 through 12 are diagrams illustrating some examples of a multiple output voltage balancer of FIG. 4.

First, referring to FIG. 5, the multiple output voltage balancer 310-1 may include a plurality of load capacitors $C_{L1}$ through $C_{L4}$ each corresponding to a difference between a plurality of voltages V1 through V4 having different levels, a plurality of balance switch sets VS1 through VS6 and VS1' through VS6' corresponding to the plurality of load capacitors $C_{L1}$ through $C_{L4}$, and a plurality of flying capacitors $C_{F1}$ through $C_{F3}$ for adjusting balance of voltages applied to the plurality of load capacitors $C_{L1}$ through $C_{L4}$ along with the plurality of balance switch sets VS1 through VS6 and VS1' through VS6'. Also, the multiple output voltage balancer 310-1 may receive current (e.g., ILF of FIG. 4) output from the switching regulator 330 (see FIG. 4) through at least one of the plurality of load capacitors $C_{L1}$ through $C_{L4}$.

For reference, each of the plurality of balance switch sets VS1 through VS6 and VS1' through VS6' may include a pair of balance switches that are alternately turned on and turned off. The pair of balance switches may include, for example, VS1 operating in phase A (ΦA) and VS1' operating in phase B (ΦB) that is opposite to phase A (ΦA). That is, VS1 and VS1', VS2 and VS2', VS3 and VS3', VS4 and VS4', VS5 and VS5', and VS6 and VS6' may each constitute a pair of balance switches.

In more detail, for example, in phase A (ΦA), VS1 is turned on and VS1' is turned off. Also, in phase B (ΦB), VS1 is turned off and VS1' is turned on.

Furthermore, in an embodiment of phase A (ΦA), VS1 through VS6 are simultaneously turned on and VS1' through VS6' are simultaneously turned off. Also, in an embodiment of phase B (ΦB), VS1 through VS6 are simultaneously turned off and VS1' through VS6' are simultaneously turned on.

In an embodiment of phase A (ΦA), only some of VS1 through VS6 are simultaneously turned on and only some of VS1' through VS6' are simultaneously turned off. Also, in an embodiment of phase B (ΦB), only some of VS1 through VS6 are simultaneously turned off and only some of VS1' through VS6' are simultaneously turned on.

However, for convenience of explanation, an embodiment of the inventive concept will be described assuming that VS1 through VS6 are simultaneously turned on or off and VS1' through VS6' are simultaneously turned off or on.

The multiple output voltage balancer 310-1 configured as above may be driven as described below.

For example, $C_{F1}$ may be connected to $C_{L1}$ in ΦA and may be connected to $C_{L1}$ in ΦB, so that voltages of $C_{L1}$ and $C_{L2}$ become equal (i.e., the same).

For example, when voltages respectively applied to $C_{L1}$, $C_{L2}$, and $C_{F1}$ in ΦA are 1.1 V, 0.9 V, and 1.1 V, in a next ΦB, $C_{L1}$ and $C_{F1}$ may be connected to respectively have 1.0 V and 1.0 V. In a next ΦA, $C_{L1}$ and $C_{F1}$ may be connected to respectively have 1.05 V and 1.05 V, and in a next ΦB, $C_{L1}$ and $C_{F1}$ may be connected to respectively have 1.025 V and 1.025 V. By repeatedly performing this process, voltages applied to $C_{L3}$, $C_{L4}$, and $C_{F1}$ may become equal (i.e., the same).

This process may also be performed even between $C_{L3}$, $C_{L4}$, and $C_{F2}$. Furthermore, the above driving may also be performed even between a sum voltage of $C_{L1}$ and $C_{L1}$ (i.e., a voltage difference between V1 and V3), a sum voltage of $C_{L1}$ and $C_{L4}$ (i.e., a voltage difference between V3 and a ground voltage), and $C_{F3}$.

Through the above driving, the multiple output voltage balancer 310-1 may equally adjust a difference between the plurality of voltages V1 through VN having different levels and may output the plurality of voltages V1 through VN having different levels of which the difference is equally adjusted.

Figure 6:
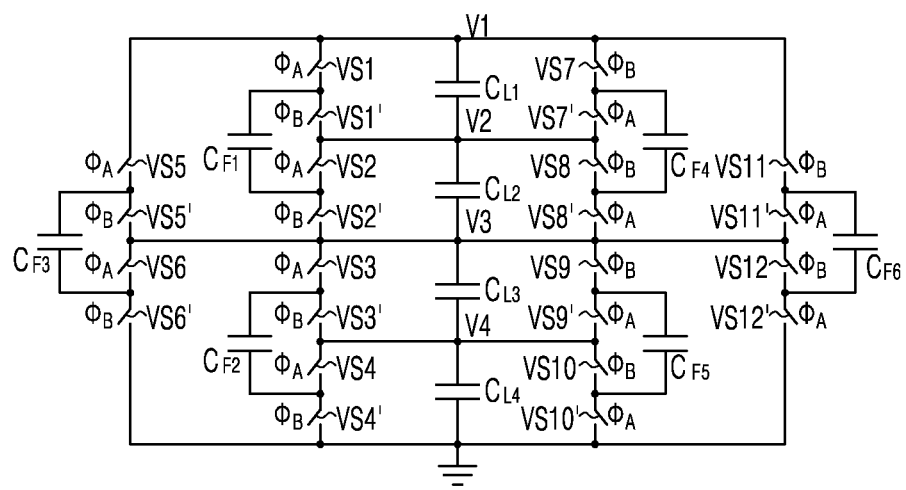

Next, referring to FIG. 6, the multiple output voltage balancer 310-2 may include a plurality of load capacitors $C_{L1}$ through $C_{L4}$ each corresponding to a difference between a plurality of voltages V1 through V4 having different levels, a plurality of balance switch sets VS1 through VS12 and VS1' through VS12' corresponding to the plurality of load capacitors $C_{L1}$ through $C_{L4}$, and a plurality of flying capacitors $C_{F1}$ through $C_{F6}$ configured to adjust balance of voltages applied to the plurality of load capacitors $C_{L1}$ through $C_{L4}$ along with the plurality of balance switch sets VS1 through VS12 and VS1' through VS12'. Also, the multiple output voltage balancer 310-2 may receive current (e.g., ILF of FIG. 4) output from the switching regulator 330 (see FIG. 4) through at least one of the plurality of load capacitors $C_{L1}$ through $C_{L4}$.

For reference, the multiple output voltage balancer 310-2 of FIG. 6 may be driven in a same manner as that of the multiple output voltage balancer 310-1 of FIG. 5, and may have a structure obtained by symmetrically mirroring the multiple output voltage balancer 310-1 of FIG. 5 about a load capacitor line (line connecting $C_{L1}$ through $C_{L4}$).

Accordingly, a voltage adjustment operation speed of the multiple output voltage balancer 310-2 of FIG. 6 may be higher than that of the multiple output voltage balancer 310-1 of FIG. 5. However, the multiple output voltage balancer 310-2 of FIG. 6 includes more balance switch sets and flying capacitors than those of the multiple output voltage balancer 310-1 of FIG. 5. The balance switch sets VS1 through VS6 and VS1' through VS6 located on the left and the balance switch sets VS7 through VS12 and VS7' through VS12' located on the right of the load capacitor line $C_{L1}$ through $C_{L4}$ from among the plurality of balance switch sets VS1 through VS12 and VS1' through VS12' may operate in opposite phases. For example, while VS1 is turned on in phase A (ΦA) and VS1' is turned on in phase B (ΦB), VS7 and VS7' respectively symmetric to VS1 and VS1' may be respectively turned on in phase B (ΦB) and phase A (ΦA).

Figure 7:
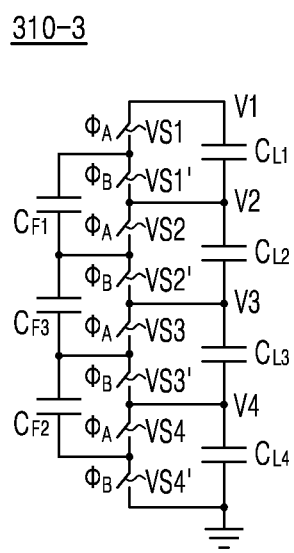

Next, referring to FIG. 7, the multiple output voltage balancer 310-3 may include a plurality of load capacitors $C_{L1}$ through $C_{L4}$ each corresponding to a difference between a plurality of voltages V1 through V4 having different levels, a plurality of balance switch sets VS1 through VS4 and VS1' through VS4' corresponding to the plurality of load capacitors $C_{L1}$ through $C_{L4}$, and a plurality of flying capacitors $C_{F1}$ through $C_{F3}$ configured to adjust balance of voltages applied to the plurality of load capacitors $C_{L1}$ through $C_{L4}$ along with the plurality of balance switch sets VS1 through VS4 and VS1' through VS4'. Also, the multiple output voltage balancer 310-3 may receive current (e.g., ILF of FIG. 4) output from the switching regulator 330 (see FIG. 4) through at least one of the plurality of load capacitors $C_{L1}$ through $C_{L4}$.

For reference, the multiple output voltage balancer 310-3 of FIG. 7 may be driven with the same voltage balance adjustment technique as that of the multiple output voltage balancer 310-1 of FIG. 5, and the number of balance switch sets may be less than that of the multiple output voltage balancer 310-1 of FIG. 5 and a connection position of $C_{F3}$ may be different.

In detail, while a voltage balance adjustment technique related to $C_{F3}$ is performed between a sum voltage of $C_{L1}$ and $C_{L1}$ (i.e., a voltage difference between V1 and V3), a sum voltage of $C_{L3}$ and $C_{L4}$ (i.e., a voltage difference between V3 and a ground voltage), and $C_{F3}$ in FIG. 5, a voltage balance adjustment technique related to $C_{F3}$ may be performed between $C_{L2}$, $C_{L3}$, and $C_{F3}$ in FIG. 7.

Also, while the multiple output voltage balancer 310-1 of FIG. 5 includes a total of six balance switch sets VS1-VS1', VS2-VS2', VS3-VS3', VS4-VS4', VS5-VS5', and VS6-VS6', the multiple output voltage balancer 310-3 of FIG. 7 may include a total of four balance switch sets VS1-VS1', VS2-VS2', VS3-VS3', and VS4-VS4'.

Figure 8:
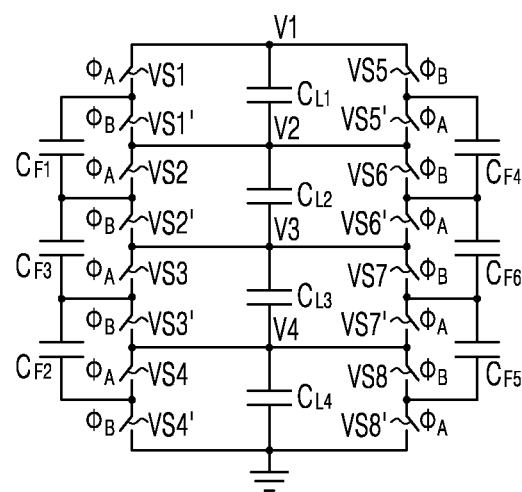

Next, referring to FIG. 8, the multiple output voltage balancer 310-4 may include a plurality of load capacitors $C_{L1}$ through $C_{L4}$ each corresponding to a difference between a plurality of voltages V1 through V4 having different levels, a plurality of balance switch sets VS1 through VS8 and VS1' through VS8' corresponding to the plurality of load capacitors $C_{L1}$ through $C_{L4}$, and a plurality of flying capacitors $C_{F1}$ through $C_{F6}$ configured to adjust balance of voltages applied to the plurality of load capacitors $C_{L1}$ through $C_{L4}$ along with the plurality of balance switch sets VS1 through VS8 and VS1' through VS8'. Also, the multiple output voltage balancer 310-4 may receive current (e.g., ILF of FIG. 4) output from the switching regulator 330 (see FIG. 4) through at least one of the plurality of load capacitors $C_{L1}$ through $C_{L4}$.

For reference, the multiple output voltage balancer 310-4 of FIG. 8 may operate with the same mechanism as that of the multiple output voltage balancer 310-3 of FIG. 7, and may have a structure obtained by symmetrically mirroring the multiple output voltage balancer 310-3 of FIG. 7 about a load capacitor line (i.e., line connecting $C_{L1}$ through $C_{L4}$).

Accordingly, a voltage adjustment operation speed of the multiple output voltage balancer 310-4 of FIG. 8 may be higher than that of the multiple output voltage balancer 310-3 of FIG. 7. However, the multiple output voltage balancer 310-4 of FIG. 8 includes more balance switch sets and flying capacitors than those of the multiple output voltage balancer 310-3 of FIG. 7. The balance switch sets VS1 through VS4 and VS1' through VS4' located on the left and the balance switch sets VS5 through VS8 and VS5' through VS8' located on the right of the load capacitor lines $C_{L1}$ through $C_{L4}$ from among the plurality of balance switch sets VS1 through VS8 and VS1' through VS8' may operate in opposite phases. For example, while VS1 is turned on in phase A (ΦA) and VS1' is turned on in phase B (ΦB), VS5 and VS5' respectively symmetric to VS1 and VS F may be respectively turned on in phase B (ΦB) and phase A (ΦA).

Figure 9:
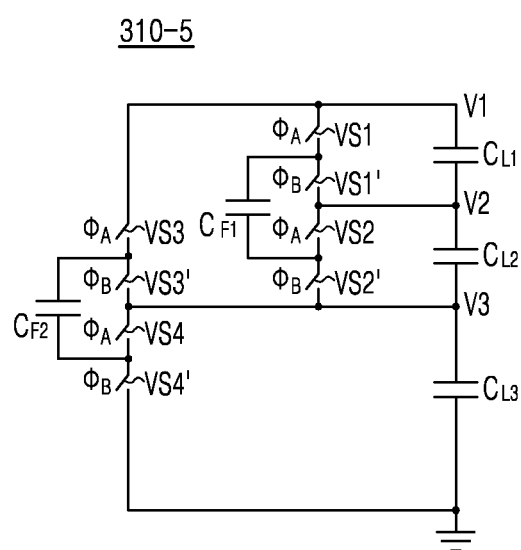

Next, referring to FIG. 9, the multiple output voltage balancer 310-5 may include a plurality of load capacitors $C_{L1}$ through $C_{L3}$ each corresponding to a difference between a plurality of voltages V1 through V3 having different levels, a plurality of balance switch sets VS1 through VS4 and VS1' through VS4' corresponding to the plurality of load capacitors $C_{L1}$ through $C_{L3}$, and a plurality of flying capacitors $C_{F1}$ and $C_{F2}$ configured to adjust balance of voltages applied to the plurality of load capacitors $C_{L1}$ through $C_{L3}$ along with the plurality of balance switch sets VS1 through VS4 and VS1' through VS4'. Also, the multiple output voltage balancer 310-5 may receive current (e.g., ILF of FIG. 4) output from the switching regulator 330 (see FIG. 4) through at least one of the plurality of load capacitors $C_{L1}$ through $C_{L3}$.

For reference, the multiple output voltage balancer 310-5 of FIG. 9 relates to a case where voltages of load capacitors are not uniform, unlike the multiple output voltage balancers 310-1 through 310-4 of FIGS. 5 through 8.

That is, because the multiple output voltage balancer 310-5 of FIG. 9 is a voltage balancer applied when a very low output voltage is not required and only a relatively high output voltage is required, the multiple output voltage balancer 3105 of FIG. 9 may include fewer load capacitors, flying capacitors, and balance switch sets than those of the multiple output voltage balancers 310-1 through 310-4 of FIGS. 5 through 8.

Although the multiple output voltage balancer 310-5 of FIG. 9 is basically driven with the same voltage balance adjustment technique as that of the multiple output voltage balancer 310-1 of FIG. 5, voltages applied to load capacitors may be set to be non-uniform as described above.

In detail, in the multiple output voltage balancer 310-5 of FIG. 9, a voltage applied to $C_{L3}$ may be the same as a sum of voltages respectively applied to $C_{L1}$ and $C_{L2}$ (i.e., voltage of $C_{L3}$=voltage of $C_{L1}$+voltage of $C_{L2}$), and voltages respectively applied to $C_{L1}$ and $C_{L2}$ may be the same.

Accordingly, for example, while V1=4 V, V2=3 V, V3=2 V, and V4=1 V in FIG. 5, V1=4 V, V2=3 V, and V3=2 V in FIG. 9.

That is, it may be found that, because V1-V2 is a voltage (1 V) applied to CL1, V2-V3 is a voltage (1 V) applied to $C_{L2}$, and V3-ground voltage is a voltage (2 V) applied to $C_{L3}$, voltages applied to load capacitors are not uniform, and only relatively high output voltages (e.g., 2 through 4 V) without a very low output voltage (e.g., a voltage less than 2 V) are output from the multiple output voltage balancer 310-5.

Figure 10:
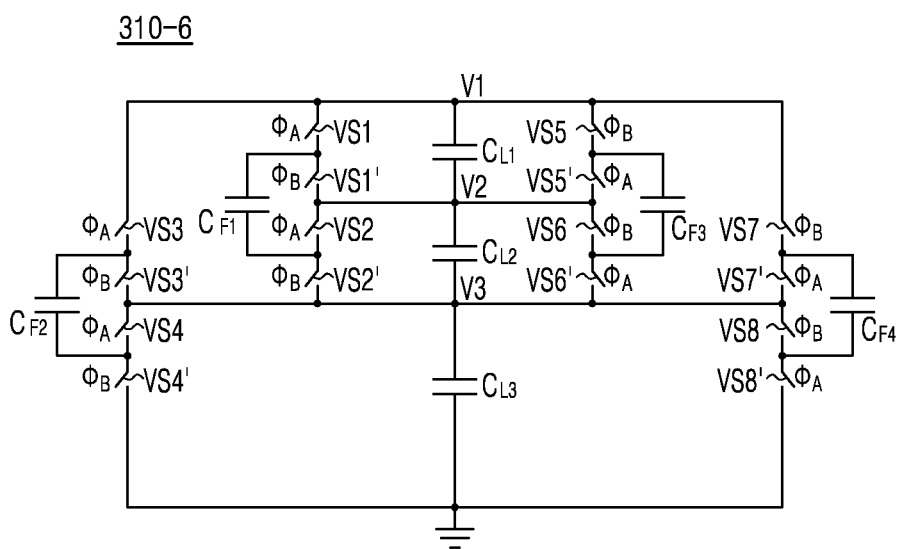

Next, referring to FIG. 10, the multiple output voltage balancer 310-6 may include a plurality of load capacitors $C_{L1}$ through $C_{L3}$ each corresponding to a difference between a plurality of voltages V1 through V3 having different levels, a plurality of balance switch sets VS1 through VS8 and VS1' through VS8' corresponding to the plurality of load capacitors $C_{L1}$ through $C_{L3}$, and a plurality of flying capacitors $C_{F1}$ through $C_{F4}$ configured to adjust balance of voltages applied to the plurality of load capacitors $C_{L1}$ through $C_{L3}$ along with the plurality of balance switch sets VS1 through VS8 and VS1' through VS8'. Also, the multiple output voltage balancer 310-6 may receive current (e.g., ILF of FIG. 4) output from the switching regulator 330 (see FIG. 4) through at least one of the plurality of load capacitors $C_{L1}$ through $C_{L3}$.

For reference, the multiple output voltage balancer 310-6 of FIG. 10 may be driven using the same technique as that of the multiple output voltage balancer 310-5 of FIG. 9, and may have a structure obtained by symmetrically mirroring the multiple output voltage balancer 310-5 of FIG. 9 about a load capacitor line (i.e., line connecting $C_{L1}$ through $C_{L3}$).

Accordingly, a voltage adjustment operation speed of the multiple output voltage balancer 310-6 of FIG. 10 may be higher than that of the multiple output voltage balancer 310-5 of FIG. 9. However, the multiple output voltage balancer 310-6 of FIG. 10 may include more balance switch sets and flying capacitors than those of the multiple output voltage balancer 310-5 of FIG. 9. The balance switch sets VS1 through VS4 and VS1' through VS4' located on the left and the balance switch sets VS5 through VS8 and VS5' through VS8' located on the right of the load capacitor lines $C_{L1}$ through $C_{L3}$ from among the plurality of balance switch sets VS1 through VS8 and VS1' through VS8' may operate in opposite phases. For example, while VS1 is turned on in phase A (ΦA) and VS1' is turned on in phase B (ΦB), VS5 and VS5' respectively symmetric to VS1 and VS1' may be respectively turned on in phase B (ΦB) and phase A (ΦA).

Figure 11:
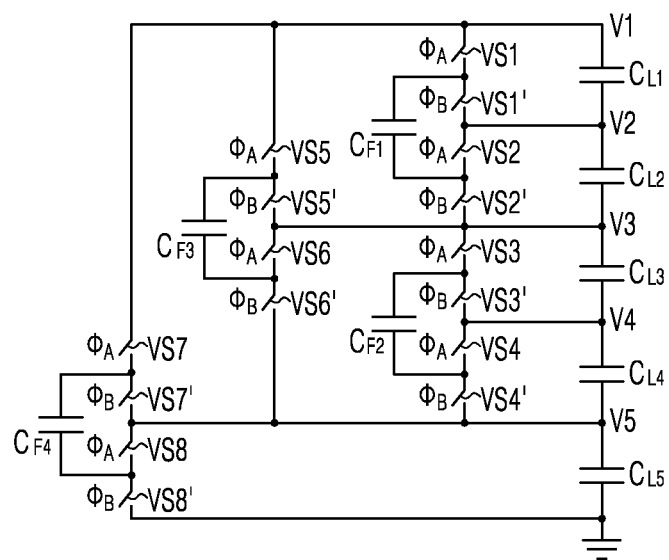

Next, referring to FIG. 11, the multiple output voltage balancer 310-7 may include a plurality of load capacitors $C_{L1}$ through $C_{L5}$ each corresponding to a difference between a plurality of voltages V1 through V5 having different levels, a plurality of balance switch sets VS1 through VS8 and VS1' through VS8' corresponding to the plurality of load capacitors $C_{L1}$ through $C_{L5}$, and a plurality of flying capacitors $C_{F1}$ through $C_{F4}$ configured to adjust balance of voltages applied to the plurality of load capacitors $C_{L1}$ through $C_{L5}$ along with the plurality of balance switch sets VS1 through VS8 and VS1' through VS8'. Also, the multiple output voltage balancer 310-7 may receive current (e.g., ILF of FIG. 4) output from the switching regulator 330 (see FIG. 4) through at least one of the plurality of load capacitors $C_{L1}$ through $C_{L5}$.

For reference, the multiple output voltage balancer 310-7 of FIG. 11 may be driven using a same voltage balance technique as that of the multiple output voltage balancer 310-5 of FIG. 9, may be a voltage balancer applied when a very low output voltage is not required and only a relatively high output voltage is required, and is similar to the multiple output voltage balancer 310-5 of FIG. 9 in that voltages of load capacitors are not uniform.

However, because the number of output voltages of the multiple output voltage balancer 310-7 of FIG. 11 is greater than that of the multiple output voltage balancer 310-5 of FIG. 9, the multiple output voltage balancer 310-7 of FIG. 11 may include more load capacitors, balance switch sets, and flying capacitors than those of the multiple output voltage balancer 310-5 of FIG. 9.

In detail, in the multiple output voltage balancer 310-7 of FIG. 11, a voltage applied to $C_{L5}$ may be the same as a sum of voltages respectively applied to $C_{L1}$ through $C_{L4}$ and voltages respectively applied to $C_{L1}$ through $C_{L4}$ may be the same.

Accordingly, for example, in FIG. 11, V1=0.8 V, V2=0.7 V, V3=0.6 V, V4=0.5 V, and V5=0.4 V.

That is, it may be found that, because V1-V2 is 0.1 V applied to $C_{L1}$, V2-V3 is a 0.1 V applied to $C_{L2}$, V3-V4 is 0.1 V applied to $C_{L3}$, V4-V5 is 0.1 V applied to $C_{L4}$, and V5-ground voltage is 0.4 V applied to $C_{L5}$, voltages applied to load capacitors are not uniform, and only relatively high output voltages (e.g., 0.4 V through 0.8 V) without a very low output voltage (e.g., voltage less than 0.4 V) are output from the multiple output voltage balancer 310-7.

Figure 12:
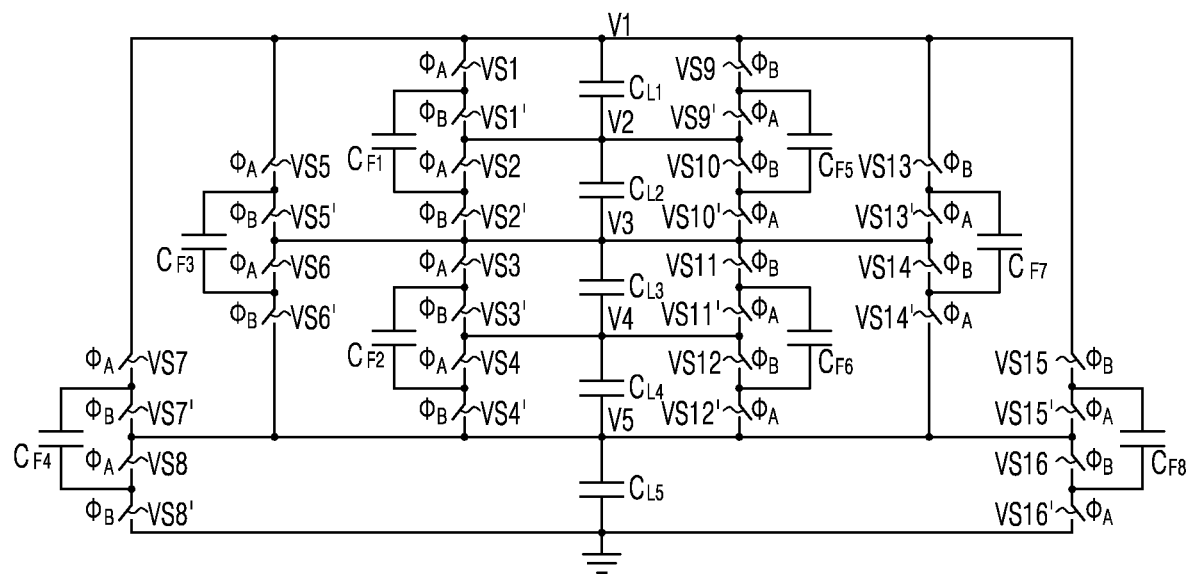

Referring to FIG. 12, the multiple output voltage balancer 310-8 may include a plurality of load capacitors $C_{L1}$ through $C_{L5}$ each corresponding to a difference between a plurality of voltages V1 through V5 having different levels, a plurality of balance switch sets VS1 through VS16 and VS1' through VS16' corresponding to the plurality of load capacitors $C_{L1}$ through $C_{L5}$, and a plurality of flying capacitors $C_{F1}$ through $C_{F8}$ configured to adjust balance of voltages applied to the plurality of load capacitors $C_{L1}$ through $C_{L5}$ along with the plurality of balance switch sets VS1 through VS16 and VS1' through VS16'. Also, the multiple output voltage balancer 310-8 may receive current (e.g., ILF of FIG. 4) output from the switching regulator 330 (see FIG. 4) through at least one of the plurality of load capacitors $C_{L1}$ through $C_{L5}$.

For reference, the multiple output voltage balancer 310-8 of FIG. 12 may be driven using the same technique as that of the multiple output voltage balancer 310-7 of FIG. 11, and may have a structure obtained by symmetrically mirroring the multiple output voltage balancer 310-7 of FIG. 11 about a load capacitor line (i.e., line connecting $C_{L1}$ through $C_{L5}$.

Accordingly, a voltage adjustment operation speed of the multiple output voltage balancer 310-8 of FIG. 12 may be higher than that of the multiple output voltage balancer 310-7 of FIG. 11. However, the multiple output voltage balancer 310-8 of FIG. 12 includes more balance switch sets and flying capacitors than those of the multiple output voltage balancer 310-7 of FIG. 11. The balance switch sets VS1 through VS8 and VS1' through VS8' located on the left and the balance switch sets VS9 through VS16 and VS9' through VS16' located on the right of the load capacitor lines $C_{L1}$ through $C_{L5}$ from among the plurality of balance switch sets VS1 through VS16 and VS1' through VS16' may operate in opposite phases. For example, while VS1 is turned on in phase A (ΦA) and VS1' is turned on in phase B (ΦB), VS9 and VS9' respectively symmetric to VS1 and VS1' may be respectively turned on in phase B (ΦB) and phase A (ΦA).

As such, the multiple output voltage balancer 310 may have various structures. The multiple output voltage balancer 310 may have a structure (e.g., a structure obtained by combining or partially modifying the above structures) other than the above structures, and a detailed description thereof will be omitted.

Referring back to FIG. 4, the switching regulator 330 may operate together with the multiple output voltage balancer 310 to generate the output voltage VET_APT in the DL-ET mode. Also, the switching regulator 330 may operate to generate the output voltage VET_APT in the APT mode. Also, the switching regulator 330 may be controlled by the switching regulator controller 350.

In detail, the switching regulator 330 may operate in parallel with the multiple output voltage balancer 310 in the DL-ET mode. That is, in the DL-ET mode, the switching regulator 330 may boost or reduce the output current ILF by controlling turning-on or turning-off of a switch provided therein based on a switching regulator control signal SRC received from the switching regulator controller 350.

In the DL-ET mode, the switching regulator control signal SRC applied to the switching regulator 330 may be generated based on an output of a compensation comparator CCP in the switching regulator controller 350.

Also, in the DL-ET mode, the sum current IET_APT of the output current ILF of the switching regulator 330 and the output current IHF of the multiple output voltage balancer 310 may be supplied to the power amplifier PA. In this case, the output current ILF of the switching regulator 330 may be controlled based on the switching regulator control signal SRC so that an average of the output current IHF of the multiple output voltage balancer 310 is approximately 0. The sum current IET_APT of ILF and IHF may be supplied to the power amplifier PA in a state where noise is removed through the output filter 395 (i.e., IET_APT').

For reference, the output current ILF of the switching regulator 330 may include current of a low-frequency component (e.g., a frequency less than 1 MHz) and the output current IHF of the multiple output voltage balancer 310 may include current of a high-frequency component (e.g., a frequency greater than 1 MHz).

An inductor L may be a power inductor of the switching regulator 330. Accordingly, the inductor L may be connected to an output end of the switching regulator 330 and contribute towards generation of a continuous current waveform.

For reference, although the inductor L is provided outside the switching regulator 330 in FIG. 4, the inductor L may be provided inside the switching regulator 330. However, for convenience of explanation, an embodiment of the inventive concept will be described assuming that the inductor L is provided outside the switching regulator 330.

In the APT mode, the switching regulator 330 may independently regulate an input voltage (i.e., the power VIN supplied from a power source (e.g., a battery)) to a target level based on the switching regulator control signal SRC received from the switching regulator controller 350. The switching regulator 330 may apply a regulated voltage VSR as the output voltage VET_APT to the power amplifier PA. The voltage VSR regulated by the switching regulator 330 may be applied as the output voltage VET_APT to the power amplifier PA after noise is removed through the output filter 395.

In the APT mode, the switching regulator control signal SRC applied to the switching regulator 330 may be generated based on an output of an output comparator OCP in the switching regulator controller 350.

For reference, the switching regulator 330 may include, for example, but is not limited to, a dual-phase hybrid buck-boost converter. That is, the switching regulator 330 may include a buck converter, a boost converter, a buck-boost converter, a cuk converter, or another DC-DC converter.

In contrast, in each of the DL-ET mode and the APT mode, driving entities other than the driving entities described herein may operate.

However, for convenience of explanation, an embodiment of the inventive concept will be described assuming that the switching regulator 330 and the multiple output voltage balancer 310 operate together in the DL-ET mode, and the switching regulator 330 operates in the APT mode.

In the DL-ET mode, the switching regulator controller 350 may sense the output current IHF of the multiple output voltage balancer 310, and may control the switching regulator 330 based on a sensing value SV. The switching regulator controller 350 may be controlled by the main controller 360.

In detail, the switching regulator controller 350 may include a feedback loop FL, an operational transconductance amplifier (OTA), a multiplexer MUX, a summer ADD (e.g., an adder logic circuit), the compensation comparator CCP, the digital-to-analog converter DAC, and the output comparator OCP. For example, the switch array 370 may be connected between an output of the multiple output voltage balancer 310 and a node, the node may be connected to an output of the switching regulator 330, and a wire may be connected between the node and an input of the summer ADD.

The feedback loop FL may be used to sense the output current IHF of the multiple output voltage balancer 310.

That is, in the DL—ET mode, the feedback loop FL may be used to sense the output current IHF of the multiple output voltage balancer 310 to generate a sensing value SV, and may apply the sensing value SV to the summer ADD.

The sensing value SV may be, for example, but is not limited to, a current value or a voltage value.

The OTA may output a difference value DV by comparing a difference between any one (e.g., V1) of the plurality of voltages V1 through VN having different levels output from the multiple output voltage balancer 310 and a reference output voltage signal (e.g., VREF1) corresponding to the voltage.

The OTA may receive the reference output voltage signal (e.g., VREF1) from the main controller 360. For reference, the modem 100 may calculate reference output voltage values based on output power of the power amplifier PA and may apply the calculated reference output voltage values to the main controller 360. The main controller 360 may generate a plurality of reference output voltage signals VREF1 through VREFN based on the received reference output voltage values, and may apply any one of the generated plurality of reference output voltage signals VREF1 through VREFN to the OTA of the switching regulator controller 350.

When a voltage applied from the multiple output voltage balancer 310 to the OTA is V1, VREF1 corresponding to the voltage may be applied as a reference output voltage signal from the main controller 360 to the OTA. Also, when a voltage applied from the multiple output voltage balancer 310 to the OTA is V3, VREF3 corresponding to the voltage may be applied as a reference output voltage signal from the main controller 360 to the OTA.

That is, the OTA may receive, through a negative terminal (−), information on any one voltage (e.g., V1) from among the plurality of voltages V1 through VN having different levels output from the multiple output voltage balancer 310. Also, the OTA may receive, through a positive terminal (+), information on any one signal (e.g., VREF1) corresponding to the voltage (e.g., V1) from among the plurality of reference output voltage signals VREF1 through VREFN from the main controller 360. Accordingly, the OTA may compare a voltage having a specific level with a specific reference output voltage signal corresponding to the voltage having the specific level, and may output the difference value DV between the voltage having the specific level and the specific reference output voltage signal corresponding to the voltage having the specific level based on a comparison result.

For example, the OTA may compare the voltage V1 having a first level with the first reference output voltage signal VREF1, and may output a difference value between the voltage V1 having the first level and the first reference output voltage signal VREF1 based on a comparison result.

For reference, the difference value DV output from the OTA may be, but is not limited to, a current value or a voltage value proportional to a difference between a voltage having a specific level and a reference output voltage corresponding to the voltage having the specific level. Also, although values respectively input through the positive terminal (+) and the negative terminal (−) of the OTA (i.e., values shown in FIG. 4) may be reversed and may be respectively input through the negative terminal (−) and the positive terminal (+), an embodiment of the inventive concept will be described assuming that the values (i.e., the values shown in FIG. 4) are input through the positive terminal (+) and the negative terminal (−) of the OTA.

In the DL-ET mode, the summer ADD may sum the difference value DV output from the OTA and the sensing value SV of the output current IHF of the multiple output voltage balancer 310 sensed by the feedback loop FL to generate a compensation value CV and may output the compensation value CV. The output compensation value CV may be applied to the compensation comparator CCP.

For reference, the compensation value CV output from the summer ADD may be, but is not limited to, a current value or a voltage value.

The compensation comparator CCP may compare the compensation value CV output from the summer ADD with a reference value.

That is, the compensation comparator CCP may receive the compensation value CV output from the summer ADD through a positive terminal (+), and may receive the reference value through a negative terminal (−). The compensation comparator CCP may output a comparison result between the received compensation value CV and the reference value to the multiplexer MUX.

In more detail, when the compensation value CV is greater than the reference value, the compensation comparator CCP may output a high level signal (e.g., '1'), and when the compensation value CV is less than the reference value, the compensation comparator CCP may output a low level signal (e.g., '0').

For reference, the negative terminal (−) may be grounded, and in this case, the reference value may be zero. Also, although values respectively input through the positive terminal (+) and the negative terminal (−) of the compensation comparator CCP (i.e., values shown in FIG. 4) may be reversed and may be respectively input through the negative terminal (−) and the positive terminal (+), an embodiment of the inventive concept will be described assuming that the values (i.e., the values shown in FIG. 4) are input through the positive terminal (+) and the negative terminal (−) of the compensation comparator CCP.

The digital-to-analog converter DAC may convert the average power signal D_REF received from the outside into a reference voltage signal A_REF.

That is, the digital-to-analog converter DAC may receive the average power signal D_REF from the modem 100 through the MIPI 130, may convert the received average power signal D_REF into the reference voltage signal A_REF, and may output the reference voltage signal A_REF to the output comparator OCP.

The output comparator OCP may compare the reference voltage signal A_REF from the digital-to-analog converter DAC with the output voltage VET_APT.

That is, the output comparator OCP may receive the reference voltage signal A_REF from the digital-to-analog converter DAC through a positive terminal (+), and may receive the output voltage VET_APT through a negative terminal (−). Also, the output comparator OCP may output a comparison result between the received reference voltage signal A_REF and output voltage VET_APT to the multiplexer MUX.

For reference, an output end of the supply modulator 300-1 may be connected to the negative terminal (−) of the output comparator OCP as well as the power amplifier PA. For example, an output of the output filter 395 providing the output voltage VET_APT may be provided to an input terminal of the output comparator OCP. In this case, the output voltage VET_APT generated by the supply modulator 300-1 may be directly applied to the negative terminal (−) of the output comparator OCP. Also, a connection circuit (not shown) (e.g., a circuit including a resistor and a capacitor) for connecting the output end of the supply modulator 300-1 and the negative terminal (−) of the output comparator OCP may be provided in the supply modulator 300-1. In this case, the connection circuit may reduce a level of the output voltage VET_APT generated and output from the supply modulator 300-1 and then may apply the output voltage VET_APT whose level is reduced to the negative terminal (−) of the output comparator OCP.

Also, although values respectively input through the positive terminal (+) and the negative terminal (−) of the output comparator OCP (i.e., values shown in FIG. 4) may be reversed and may be respectively input through the negative terminal (−) and the positive terminal (+), an embodiment of the inventive concept will be described assuming that the values (i.e., the values shown in FIG. 4) are input through the positive terminal (+) and the negative terminal (−) of the output comparator OCP.

The multiplexer MUX may output one of outputs of the compensation comparator CCP and the output comparator OCP to the switching regulator 330 as the switching regulator control signal SRC.

In an embodiment, in the APT mode, the multiplexer MUX outputs the output of the output comparator OCP to the switching regulator 330 as the switching regulator control signal SRC, and in the DL-ET mode, the multiplexer MUX outputs the output of the compensation comparator CCP to the switching regulator 330 as the switching regulator control signal SRC.

For reference, when the output of the compensation comparator CCP is a high level signal, the switching regulator control signal SRC may also be a high level signal. Also, when the switching regulator 330 receives a high level signal as the switching regulator control signal SRC, the output current ILF output from the switching regulator 330 may be boosted. In contrast, when the output of the compensation comparator CCP is a low level signal, the switching regulator control signal SRC may also be a low level signal. Also, when the switching regulator 330 receives a low level signal as the switching regulator control signal SRC, the output current ILF output from the switching regulator 330 may be reduced.

That is, through this ILF boosting and reducing mechanism, a current value of ILF may be adjusted so that an average of IHF is approximately 0, and thus a sum of voltages applied to the plurality of load capacitors CL1 through CLN provided in the multiple output voltage balancer 310 may be kept at a certain level (e.g., V1 that is a highest level voltage).

As such, the switching regulator controller 350 may sense output current of the multiple output voltage balancer 310 in the DL-ET mode based on the above-described structures and characteristics, and may control the switching regulator 330 based on the sensing value SV.

For reference, although not shown in FIG. 4, the switching regulator controller 350 may sense a factor other than an output current of the multiple output voltage balancer 310, and may control the switching regulator 330 based on a corresponding sensing value. That is, the feedback loop FL may sense a factor other than output current of the multiple output voltage balancer 310, and may apply a sensing value to the summer ADD. When the feedback loop FL senses a different factor, a feedback loop having a path different from that shown in FIG. 4 may be configured.

For example, the switching regulator controller 350 may sense factors such as a current flowing through the multiple output voltage balancer 310 or and internal voltage of the multiple output voltage balancer 310.

However, for convenience of explanation, an embodiment of the inventive concept will be described assuming that the switching regulator 350 senses output current of the multiple output voltage balancer 310 and controls the switching regulator 330 based on the sensing value SV.

The switch array 370 may include the plurality of switches S1 through SN (where N is a natural number equal to or greater than 2) respectively corresponding to the plurality of voltages V1 through VN having different levels output from the multiple output voltage balancer 310. Also, opening and closing operations of the plurality of switches S1 through SN in the switch array 370 may be controlled by the switch control signal SW applied from the switch controller 380. Accordingly, the switch array 370 may select one of the plurality of voltages V1 through VN having different levels based on the switch control signal SW, and may apply the selected voltage to the power amplifier PA.

The discrete-level controller 390 may generate a level control signal ENV_LV including multiple pieces of envelope level information based on the digital envelope signal D_ENV received from the outside. Also, the discrete-level controller 390 may be controlled by the main controller 360.

In detail, the discrete-level controller 390 may receive the digital envelope signal D_ENV from the modem 100 and may generate and output the level control signal ENV_LV including the multiple pieces of envelope level information based on the digital envelope signal D_ENV received from the modem 100. Also, the level control signal ENV_LV output from the discrete-level controller 390 may be applied to the switch controller 380.

The switch controller 380 may receive the level control signal ENV_LV from the discrete-level controller 390, and may control the opening and closing operation of the plurality of switches S1 through SN based on the level control signal ENV_LV received from the discrete-level controller 390. That is, the switch controller 380 may generate the switch control signal SW for controlling the opening and closing operation of the switch array 370 based on the level control signal ENV_LV, and may apply the generated switch control signal SW to the switch array 370. Also, the switch controller 380 may be controlled by the main controller 360.

In detail, in the DL-ET mode, the switch controller 380 may control the opening and closing operation of the switch array 370 to select a voltage to be applied to the power amplifier PA, from among the plurality of voltages V1 through VN having different levels.

Also, in the APT mode, the switch controller 380 may connect a load capacitor corresponding to the controlled switch from among the plurality of load capacitors CL1 through CLN to the power amplifier PA by controlling at least one of the plurality of switches S1 through SN.

In the APT mode, a decoupling capacitor connected to the output voltage VET_APT may be required.

Accordingly, in the APT mode, the switch controller 380 may connect at least one of the plurality of load capacitors CL1 through CLN of the multiple output voltage balancer 310 to the power amplifier PA by controlling the switch array 370. Also, the capacitor connected to the power amplifier PA may be used as a decoupling capacitor.

The main controller 360 may output any one of the plurality of reference output voltage signals VREF1 through VREFN to the switching regulator controller 350. Also, the main controller 360 may determine a tracking mode, and may control at least one of the multiple output voltage balancer 310, the switch controller 380, the switching regulator controller 350, and the discrete-level controller 390 based on the determined tracking mode.

In detail, the main controller 360 may receive a tracking mode determination signal from the modem 100 through the MIPI 130 (see FIG. 1), and determine the tracking mode of the supply modulator 300-1.

Accordingly, when the tracking mode is determined to be the DL-ET mode, the main controller 360 may control a parallel operation of the multiple output voltage balancer 310 and the switching regulator 330. In this case, the multiple output voltage balancer 310 and the switching regulator 330 may together generate a modulation voltage according to the DL-ET mode and may apply the generated modulation voltage to the power amplifier PA as the output voltage VET_APT.

When the tracking mode is determined to be the APT mode, the main controller 360 may control an output voltage generation operation of the switching regulator 330. In this case, the switching regulator 330 may generate a modulation voltage according to the APT mode and may apply the generated modulation voltage to the power amplifier PA as the output voltage VET_APT.

In the APT mode, the switch controller 380 may control the opening and closing operation of the switch array 370 to activate some of the plurality of load capacitors CL1 through CLN as a decoupling capacitor.

The main controller 360 may receive various signals (e.g., various control signals such as an output voltage level signal) other than the tracking mode determination signal from the modem 100 through the MIPI 130, and may control components such as the multiple output voltage balancer 310, the switch controller 380, the switching regulator controller 350, and the discrete-level controller 390 based on the received various signals.

For reference, although the main controller 360 controls at least one of the multiple output voltage balancer 310, the switch controller 380, the switching regulator controller 350, and the discrete-level controller 390 in FIG. 4, embodiments of the inventive concept are not limited thereto. That is, the main controller 360 may control operations of components other than the above-described components.

However, for convenience of explanation, an embodiment of the inventive concept will be described assuming that the main controller 360 controls at least one of the multiple output voltage balancer 310, the switch controller 380, the switching regulator controller 350, and the discrete-level controller 390.

In addition to the above-described components, the supply modulator 300-1 may further include an additional capacitor (not shown), an oscillator (not shown), a bandgap reference circuit (not shown), or the like.

In detail, the additional capacitor may be connected near an output end of the supply modulator 300-1, and may remove high-frequency noise that may be in a circuit of the supply modulator 300-1. Also, the oscillator may be a circuit required when using an n-channel metal-oxide semiconductor (NMOS) structure (i.e., a gate-boosted NMOS structure) to improve the characteristics of the plurality of switches S1 through SN. Also, the bandgap reference circuit is a circuit that supplies a reference voltage or reference current needed when each component operates, and not affected greatly by operations, voltages, temperature changes, etc.

As such, the supply modulator 300-1 may have the above-described structure and characteristics. Also, based on the structure and the characteristics, the supply modulator 300-1 may be driven in any one of the DL-ET mode and the APT mode and may apply the output voltage VET_APT to the power amplifier PA.

Next, referring to FIG. 13, waveform characteristics of output voltages according to tracking modes are shown.

In detail, FIG. 13 illustrates an output voltage waveform APT according to the APT mode and an output voltage waveform DL-ET according to the DL-ET mode. For reference, FIG. 13 illustrates output voltage waveform changes according to the APT mode and the DL-ET mode at certain time intervals (e.g., transmission time intervals (TTIs)).

Herein, the APT mode is a tracking mode in which a modulation voltage that varies based on a peak level of an envelope RF_OUT_ENV of the RF output signal RF_OUT at a certain time interval (e.g., a transmission time interval (TTI)) is applied to the power amplifier PA (see FIG. 1). Also, the DL-ET mode is a tracking mode in which a modulation voltage that follows a level of an envelope RF_OUT_ENV of the RF output signal RF_OUT is instantaneously applied to the power amplifier PA (see FIG. 1), wherein the modulation voltage is determined to be one of a plurality of voltages having different levels output from the multiple output voltage balancer 310.

For reference, the envelope RF_OUT_ENV of the RF output signal RF_OUT may be generated based on an amplitude (magnitude) of the RF output signal RF_OUT.

Then, FIGS. 14 through 16 illustrate a technique by which the supply modulator 300-1 generates the output voltage VET_APT in the DL-ET mode.

Before describing FIGS. 14 through 16, a basic output voltage generation technique in the DL-ET mode will be described as follows.

In detail, in the DL-ET mode, the switching regulator 330 may supply the output current ILF of a low-frequency component based on the switching regulator control signal SRC.

That is, when the magnitude of the output current ILF of the switching regulator 330 is less than the magnitude of the sum current IET_APT required by the power amplifier PA (see FIG. 1), the multiple output voltage balancer 310 may supply additional current (i.e., the output current IHF of a high-frequency component) to the power amplifier PA (see FIG. 1). For reference, when the switching regulator control signal SRC is a low level signal, the magnitude of the output current ILF of the switching regulator 330 may be less than the magnitude of the sum current IET_APT needed by the power amplifier PA (see FIG. 1).

In contrast, when the magnitude of the output current ILF of the switching regulator 330 is greater than the magnitude of the sum current IET_APT required by the power amplifier PA (see FIG. 1), the multiple output voltage balancer 310 may absorb excess current (i.e., the output current IHF of the high-frequency component). For reference, when the switching regulator control signal SRC is a high level signal, the magnitude of the output current ILF of the switching regulator 330 may be greater than the magnitude of the sum current IET_APT needed by the power amplifier PA (see FIG. 1).

Furthermore, the output current ILF of the switching regulator 330 may be controlled based on the switching regulator control signal SRC so that an average of the output current IHF of the multiple output voltage balancer 310 is approximately 0. For reference, because IET_APT=ILF+IHF, when an average value of IET_APT is constant, an average value of IHF may decrease as an average value of ILF increases and an average value of IHF may increase as an average value of ILF decreases.

FIGS. 14 through 16 will be described assuming that there are four output voltages V1 through V4 (V1 (4 V)>V2 (3 V)>V3 (2 V)>V4 (1 V)) of the multiple output voltage balancer 310 based on the basic output voltage generation mechanism in the DL-ET mode.

First, FIG. 14 illustrates that an average value of IHF is 0 in a specific interval (e.g., a time corresponding to 1 TTI).

In detail, when a sum of voltages applied to a plurality of load capacitors in the multiple output voltage balancer 310 is exactly V1 (4 V), an average value of IHF may be 0, and a sum of voltages applied to the plurality of load capacitors in the multiple output voltage balancer 310 may be kept at V1 (4 V).

Next, FIG. 15 illustrates that an average value of IHF is a positive value (i.e., +) in a specific interval (e.g., a time corresponding to 1 TTI).

In detail, when a sum (e.g., 4.1 V) of voltages applied to the plurality of load capacitors in the multiple output voltage balancer 310 is greater than V1 (4 V), ILF output from the switching regulator 330 may decrease, and an average value of IHF may increase to a positive value because IHF=IET_APT-ILF. Through this process, a sum of voltages applied to the plurality of load capacitors in the multiple output voltage balancer 310 may decrease to be less than 4.1 V.

Last, FIG. 16 illustrates that an average value of IHF is a negative value (i.e., −) in a specific interval (e.g., a time corresponding to 1 TTI).

In detail, a sum (e.g., 3.9 V) of voltages applied to the plurality of load capacitors in the multiple output voltage balancer 310 is less than V1 (4 V), ILF output from the switching regulator 330 may increase, and an average value of IHF may decrease to a negative value because IHF=IET_APT-ILF. Through this process, a sum of voltages applied to the plurality of load capacitors in the multiple output voltage balancer 310 may increase to be greater than 3.9 V.

As such, the supply modulator 300-1 according to an embodiment of the inventive concept may generate a modulation voltage that varies according to any one of the APT mode and the DL-ET mode and may apply the generated modulation voltage to the power amplifier PA (see FIG. 1) as a power supply voltage.

Furthermore, based on the above characteristics, because a voltage difference between the RF output signal RF_OUT of the power amplifier PA (see FIG. 1) and a modulation voltage (i.e., the output voltage VET_APT applied to the power amplifier PA (see FIG. 1)) of the supply modulator 300-1 is reduced, energy waste may be minimized and the lifespan of a battery may be increased.

In the case of the power efficiency of the power amplifier PA (see FIG. 1), the power efficiency in the D-ET mode is greater than the power efficiency in the APT mode. In contrast, in the case of the power efficiency of the supply modulator 300-1, the power efficiency in the APT mode is greater than the power efficiency in the DL-ET mode.

For reference, the power efficiency of an entire system, for example, the efficiency of the wireless communication apparatus 1 of FIG. 1, may be proportional to the product of the power efficiency of the supply modulator 300-1 and the power efficiency of the power amplifier (e.g., PA of FIG. 1).

For this reason, in a high power region in which a power level of the RF output signal RF_OUT (more particularly, transmission power of the antenna ANT of FIG. 1) is high, the power efficiency of the entire system may be greater in the DL-ET mode than in the APT mode. In contrast, in a low power region in which a power level of the RF output signal RF_OUT (more particularly, transmission power of the antenna ANT (see FIG. 1) is low, the power efficiency of the entire system may be greater in the APT mode than in the DL-ET mode.

For reference, the DL-ET mode is a method of tracking the envelope RF_OUT_ENV of the RF output signal RF_OUT (see FIG. 1) and limiting the output voltage VET_APT applied to the power amplifier PA (see FIG. 1) based on the plurality of voltages V1 through VN having different levels that may be output from the multiple output voltage balancer 310, and the power efficiency of the supply modulator itself in the DL-ET mode may be high. Also, in the DL-ET mode, because a linear regulator is not used, a bandwidth of the output voltage VET_ATP may be great.

Accordingly, the supply modulator 300-1 may be driven in any one of the DL-ET mode and the APT mode selectively accordingly to transmission power TX power of the antenna ANT (see FIG. 1) and may generate the output voltage VET_APT. That is, the main controller 360 may determine any one tracking mode from among the DL-ET mode and the APT mode in such a manner that the power efficiency of the entire system is improved by considering the above situation.

As such, because the supply modulator 300-1 is driven in the APT mode or the DL-ET mode to generate the output voltage VET_APT based on the above-described principle, an operation of the supply modulator 300-1 according to a tracking mode will be described below with reference to FIGS. 17 and 18.

Figure 17:
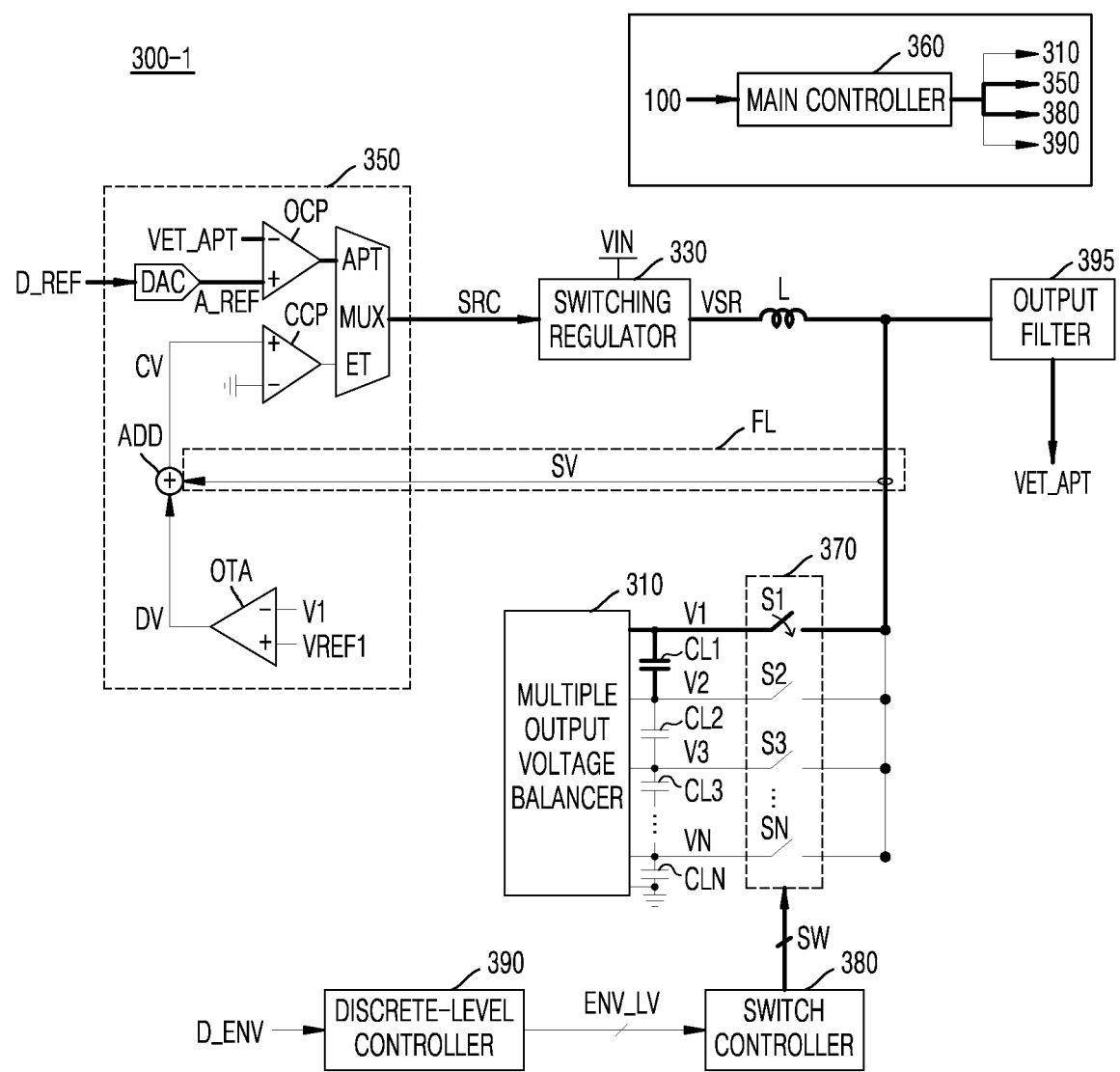
FIG. 17 is a diagram illustrating an average power tracking mode operation of the supply modulator of FIG. 4.
Figure 18:
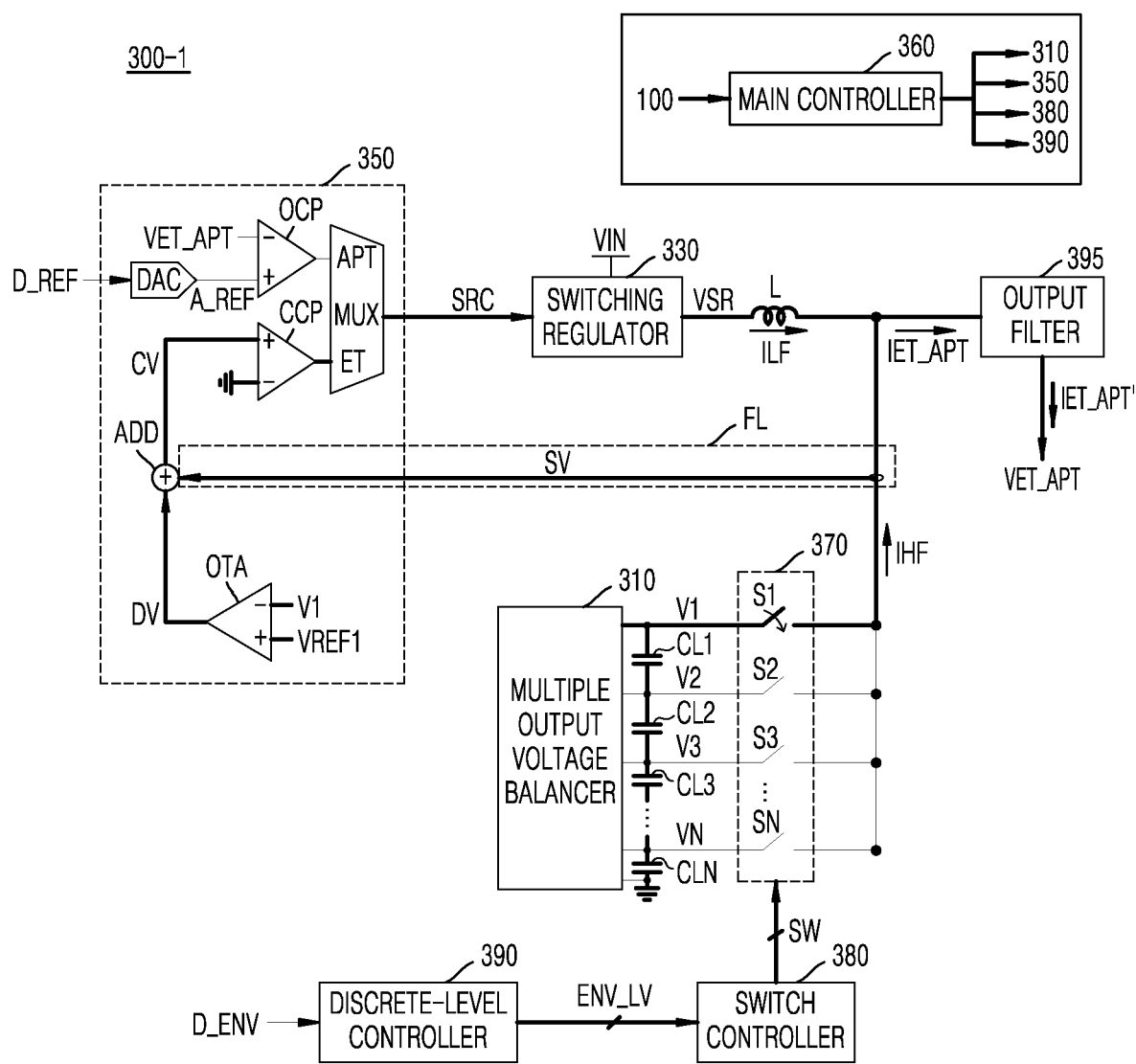
FIG. 18 is a diagram illustrating a discrete level envelope tracking mode operation of the supply modulator of FIG. 4.

For reference, portions indicated by bold lines in each of FIGS. 17 and 18 may mean operation activation paths in the corresponding drawing.

Referring to FIG. 17, an operation of the supply modulator 300-1 in the APT mode is described below.

The main controller 360 may receive an APT mode determination signal from the modem 100, and may determine the APT mode of the supply modulator 300-1 based on the APT mode determination signal received from the modem 100.

In this case, the main controller 360 may control the switching regulator controller 350 based on the determined tracking mode, and the switching regulator controller 350 may control the switching regulator 330 under the control of the main controller 360.

Accordingly, the switching regulator 330 may generate a modulation voltage VSR according to the APT mode, noise may be removed from the generated modulation voltage VSR through the output filter 395, and the modulation voltage VSR from which noise is removed may be applied to the power amplifier PA (see FIG. 1) as the output voltage VET_APT.

In an embodiment, to generate the modulation voltage VSR according to the APT mode, the digital-to-analog converter DAC of the switching regulator controller 350 may receive the average power signal D_REF from the modem 100 and may convert the average power signal D_REF received from the modem 100 into the reference voltage signal A_REF. The digital-to-analog converter DAC may apply the converted reference voltage signal A_REF to an input of the output comparator OCP, and the output comparator OCP may compare the output voltage VET_APT with the reference voltage signal A_REF to output a comparison result. Also, the output comparator OCP may output the comparison result to an input of the multiplexer MUX, and the multiplexer MUX may output the output of the output comparator OCP to the switching regulator 330 as the switching regulator control signal SRC.

The switching regulator 330 may generate the modulation voltage VSR according to the APT mode based on the switching regulator control signal SRC received from the multiplexer MUX, and may apply the generated modulation voltage VSR to the output filter 395. The output filter 395 may remove noise from the received modulation voltage VSR, and may apply the modulation voltage VSR from which noise is removed to the power amplifier PA (see FIG. 1) as the output voltage VET_APT.

For reference, although a method (e.g., a hysteretic (bang-bang) control method) of controlling the output voltage VET_APT by using the output comparator OCP in the APT mode is shown in FIG. 17, embodiments of the inventive concept are not limited thereto. That is, in an embodiment of the inventive concept, a method (e.g., a voltage mode control method) of controlling the output voltage VET_APT by using a compensator, instead of a comparator may be used in the APT mode. However, for convenience of explanation, an embodiment of the inventive concept will be described assuming that the method of controlling the output voltage VET_APT based on the output comparator OCP in the APT mode is used.

Furthermore, the main controller 360 may control the switch controller 380 based on the determined tracking mode, and the switch controller 380 may control the switch array 370 under the control of the main controller 360.

In more detail, the switch controller 380 may control opening and closing operations of some of the plurality of switches S1 through SN under the control of the main controller 360. Accordingly, the switch array 370 may turn on any one switch (e.g., S1) from among the plurality of switches S1 through SN under the control of the switch controller 380, and a load capacitor (e.g., CL1) connected to the turned-on switch (e.g., S1) may be used as a decoupling capacitor in the APT mode.

For reference, although not shown in FIG. 17, a separate capacitor (not shown) may be further provided at an output end of the supply modulator 300-1. In this case, the capacitor connected to the output end of the supply modulator 300-1 may be used as a decoupling capacitor in the APT mode.

However, for convenience of explanation, an embodiment of the inventive concept will be described assuming that, in the APT mode, any one of the plurality of load capacitors CL1 through CLN is used as a decoupling capacitor.

Referring to FIG. 18, an operation of the supply modulator 300-1 operating in the DL-ET mode is described below.

The main controller 360 may receive a DL-ET mode determination signal from the modem 100, and may determine the DL-ET mode of the supply modulator 300-1 based on the DL-ET mode determination signal received from the modem 100.

In this case, the main controller 360 may control the multiple output voltage balancer 310, the switching regulator controller 350, the switch controller 380, and the discrete-level controller 390 based on the determined tracking mode. Also, the switching regulator controller 350 may control the switching regulator 330, and the switch controller 380 may control the switch array 370. Accordingly, the switching regulator 330 and the multiple output voltage balancer 310 may together generate a modulation voltage according to the DL-ET mode, and may apply the generated modulation voltage to the power amplifier PA (see FIG. 1).

In an embodiment, the multiple output voltage balancer 310 equally adjusts a difference between the plurality of voltages V1 through VN having different levels based on current received from the switching regulator 330 and outputs the plurality of voltages V1 through VN having different levels of which the difference is equally adjusted.

The discrete-level controller 390 may receive the digital envelope signal D_ENV from the modem 100, and may generate the level control signal ENV_LV including multiple pieces of envelope level information based on the digital envelope signal D_ENV received from the modem 100. Also, the discrete-level controller 390 may apply the generated level control signal ENV_LV to the switch controller 380.

The switch controller 380 may receive the level control signal ENV_LV from the discrete-level controller 390, and may control opening and closing operations of the plurality of switches S1 through SN based on the level control signal ENV_LV received from the discrete-level controller 390. That is, the switch controller 380 may control an opening and closing operation of the switch array 370 to select, from among the plurality of voltages V1 through VN having different levels, a voltage to be applied to the power amplifier PA.

Accordingly, a switch (e.g., S1) selected from among the plurality of switches S1 through SN by the switch control signal SW may be turned on, and a voltage having a specific level (e.g., V1) corresponding to the switch may be applied to the power amplifier PA (see FIG. 1) through the turned-on switch (e.g., S1). Noise may be removed through the output filter 395 from the voltage having the specific level (e.g., V1) output through the turned-on switch (e.g., S1) to obtain the final output voltage VET_APT, and the final output voltage VET_APT may be applied to the power amplifier PA (see FIG. 1).

For reference, the output current IHF of the multiple output voltage balancer 310 supplied to the power amplifier PA (see FIG. 1) through the turned-on switch may be sensed using the feedback loop FL of the switching regulator controller 350, and the sensing value SV may be applied to the summer ADD (e.g., an adder logic circuit).

The OTA in the switching regulator controller 350 may receive a specific reference output voltage signal (e.g., VREF1) from the main controller 360 through the positive terminal (+), and may receive the voltage having the specific level (e.g., V1) from the multiple output voltage balancer 310 through the negative terminal (−). Also, the OTA may compare the specific reference output voltage signal (e.g., VREF1) with the voltage having the specific level (e.g., V1) to generate a comparison result, and may output a difference value DV between the voltage having the specific level (e.g., V1) and the specific reference output voltage signal (e.g., VREF1) based on the comparison result.

The summer ADD may sum the difference value DV output from the OTA and the sensing value SV of the output current IHF of the multiple output voltage balancer 310 sensed using the feedback loop FL to generate a compensation value CV and may output the compensation value CV. Also, the compensation value CV may be applied to an input of the compensation comparator CCP.

The compensation comparator CCP may receive the compensation value CV output from the summer ADD through the positive terminal (+), and may receive a reference value through the negative terminal (−). Also, the compensation comparator CCP may output a comparison result between the received compensation value CV and reference value to the multiplexer MUX.

In the DL-ET mode, the multiplexer MUX may output the output of the compensation comparator CCP to the switching regulator 330 as the switching regulator control signal SRC.

The switching regulator 330 may generate and output the modulation voltage VSR according to the DL-ET mode based on the switching regulator control signal SRC received from the multiplexer MUX. Also, the switching regulator 330 may generate and output current ILF according to the DL-ET mode, and the output current ILF may be supplied to the output filter 395 through the inductor L.

The output filter 395 may receive the sum current IET_APT of the output current ILF from the switching regulator 330 and the output current IHF from the multiple output voltage balancer 310, and may remove noise from the received sum current IET_APT. Also, the output filter 395 may supply the sum current IET_APT from which noise is removed to the power amplifier PA (see FIG. 1). For reference, because the output filter 395 mainly removes high-frequency noise, the output filter 395 may mainly remove noise from the output current IHF from the multiple output voltage balancer 310.

For reference, the output current ILF of the switching regulator 330 output based on the switching regulator control signal SRC may be combined with the output current IHF of the multiple output voltage balancer 310 and may be supplied to the power amplifier PA (see FIG. 1) as the sum current IET_APT forming the output voltage VET_APT.

Because noise is removed from the sum current IET_APT through the output filter 395, current (i.e., IET_APT') from which noise is removed may be finally supplied as current forming the output voltage VET_APT to the power amplifier PA (see FIG. 1).

As such, because the supply modulator 300-1 operates according to the APT mode or the DL-ET mode based on the above-described principle, another example of the supply modulator according to an embodiment of the inventive concept will be described below with reference to FIG. 19.

Figure 19:
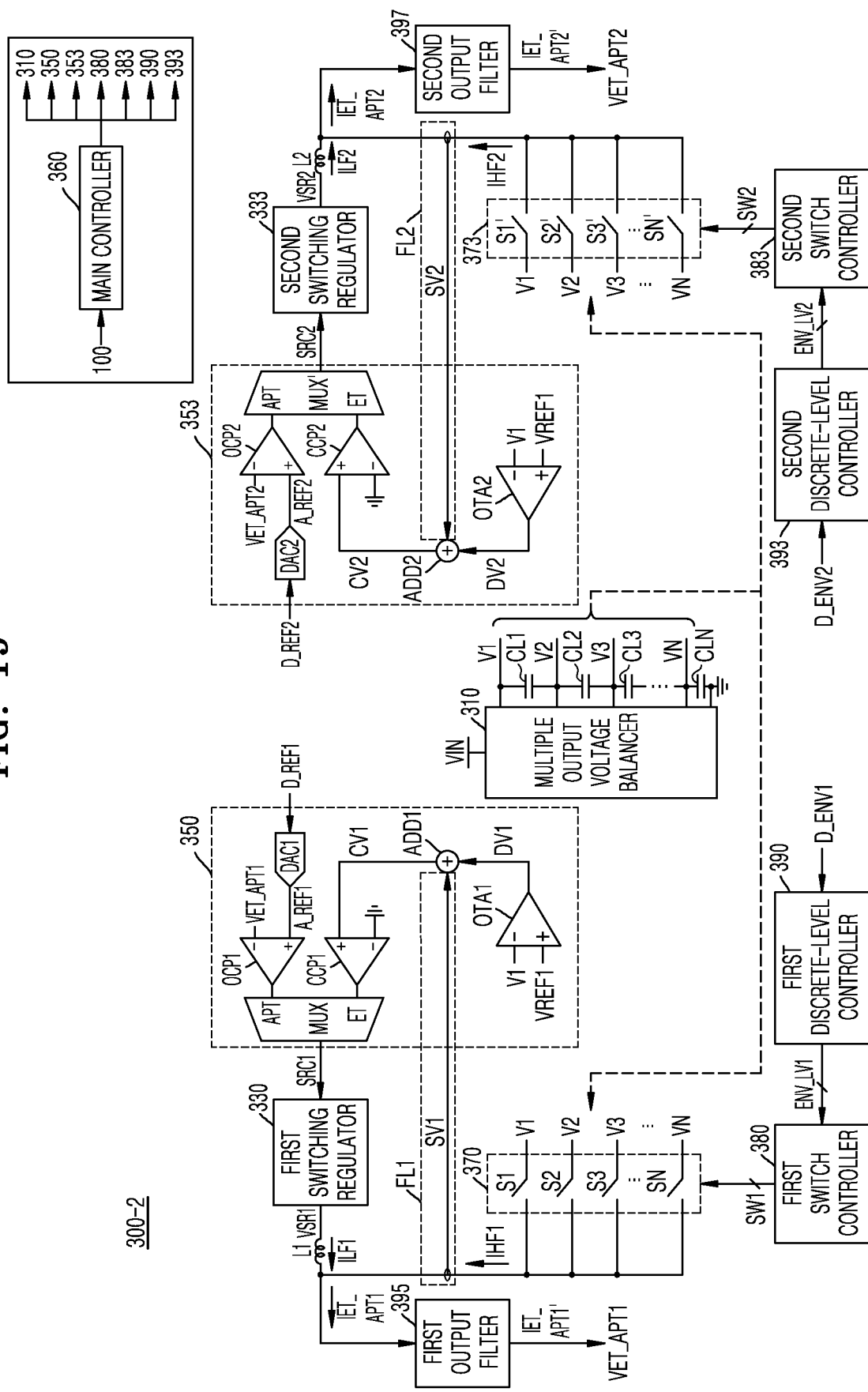
FIG. 19 is a circuit diagram illustrating another example of a supply modulator included in a wireless communication apparatus, according to an embodiments of the inventive concept.

FIG. 19 is a circuit diagram illustrating another example of a supply modulator included in a wireless communication apparatus, according to an embodiment of the inventive concept.

For reference, for convenience of explanation, it is assumed that a supply modulator 300-2 is implemented as the supply modulator 300 of the wireless communication apparatus 1 of FIG. 1. Also, the supply modulator 300-2 of FIG. 19 and the supply modulator 300-1 of FIG. 4 are the same except for some structures and mechanisms, and thus the following will mainly focus on a difference.

Referring to FIG. 19, the supply modulator 300-2 according to an embodiment of the inventive concept includes the multiple output voltage balancer 310, first and second switching regulators 330 and 333, first and second switching regulator controllers 350 and 353, the main controller 360, first and second switch arrays 370 and 373, first and second switch controllers 380 and 383, first and second discrete-level controllers 390 and 393, and first and second output filters 395 and 397.

In detail, the supply modulator 300-2 of FIG. 19 may respectively apply the first and second output voltages VET_APT1 and VET_APT2 to a plurality of power amplifiers (when there are a plurality of power amplifiers PA of FIG. 1; e.g., first and second power amplifiers).

Accordingly, in the case of the supply modulator 300-2 of FIG. 19, compared to the supply modulator 300-1 of FIG. 4, the number of each of the switching regulators, switching regulator controllers, switch arrays, switch controllers, discrete-level controllers, and output filters may be greater than one.

Also, because the supply modulator 300-2 of FIG. 19 has more signals than the supply modulator 300-1 of FIG. 4, the supply modulator 300-2 may receive first and second average power signals D_REF1 and D_REF2, and first and second digital envelope signals D_ENV1 and D_ENV2 from the modem 100 (see FIG. 1).

Also, in the supply modulator 300-2 of FIG. 19, the multiple output voltage balancer 310 may operate to generate the first or second output voltage VET_APT1 or VET_APT2 without receiving a power supply from an outside power source in the DL-ET mode, and may equally adjust a difference between the plurality of voltages V1 through VN having different levels and may output the plurality of voltages V1 through VN having different levels of which the difference is equally adjusted.

Also, the multiple output voltage balancer 310 may operate in parallel with a switching regulator that operates in the DL-ET mode from among the first and second switching regulators 330 and 333.

Also, because the plurality of load capacitors CL1 through CLN of the multiple output voltage balancer 310 are connected to both sides of the first and second power amplifiers, the plurality of load capacitors CL1 through CLN of the multiple output voltage balancer 310 may be shared for a generation operation of each of the first and second output voltages VET_APT1 and VET_APT2.

Accordingly, in an embodiment of the inventive concept, when the number of output ends of a supply modulator is to be increased, it is only necessary to increase the number of switching regulators in proportion to the number of output ends without increasing the number of multiple output voltage balancers 310.

The main controller 360 may commonly generate the reference output voltage signals VREF1 through VREFN for the first and second output voltages VET_APT1 and VET_APT2. The main controller 360 may apply any one signal (e.g., VREF1) from among the generated plurality of reference output voltage signals VREF1 through VREFN to the first and second switching regulator controllers 350 and 353.

For reference, a specific reference output voltage signal applied to a first OTA OTA1 in the first switching regulator controller 350 and a specific reference output voltage signal applied to a second OTA OTA2 in the second switching regulator controller 353 may be the same or may be different from each other.

Likewise, a voltage having a specific level of the multiple output voltage balancer 310 applied to the first OTA OTA1 in the first switching regulator controller 350 and a voltage having a specific level of the multiple output voltage balancer 310 applied to the second OTA OTA2 in the second switching regulator controller 353 may be the same or may be different from each other.

However, for convenience of explanation, an embodiment of the inventive concept will be described assuming that a specific reference output voltage signal (e.g., VREF1) and a voltage having a specific level (e.g., V1) applied to inputs of the first OTA OTA1 in the first switching regulator controller 350 and a specific reference output voltage signal (e.g., VREF1) and a voltage having a specific level (e.g., V1) of the multiple output voltage balancer 310 applied to inputs of the second OTA OTA2 in the second switching regulator controller 353 are the same.

As such, in an embodiment of the inventive concept, even when generating power supply voltages for a plurality of power amplifiers, because the number of load capacitors occupying a large proportion of a circuit area is the same as that when generating a power supply voltage for a single power amplifier, an increase in circuit area may be minimized.

For convenience of explanation, it is assumed that the first switching regulator 330, the first switching regulator controller 350, the first switch array 370, the first discrete-level controller 390, the first switch controller 380, and the first output filter 395 constitute a first modulation circuit, and the second switching regulator 333, the second switching regulator controller 353, the second switch array 373, the second discrete-level controller 393, the second switch controller 383, and the second output filter 397 constitute a second modulation circuit, and a brief description of each component of the supply modulator 300-2 is as follows.

The first modulation circuit may include the first switching regulator 330 that operates together with the multiple output voltage balancer 310 to generate the first output voltage VET_APT1 in the DL-ET mode and operates to generate the first output voltage VET_APT1 in the APT mode, and is configured to supply current to the multiple output voltage balancer 310. The first modulation circuit may include the first switching regulator controller 350 configured to sense output current IHF1 of the multiple output voltage balancer 310 in the DL-ET mode and control the first switching regulator 330 based on a sensing value SV1, and the first switch array 370 including the plurality of switches S1 through SN respectively corresponding to the plurality of voltages V1 through VN having different levels output from the multiple output voltage balancer 310 and configured to select one of the plurality of voltages V1 through VN having different levels and apply the selected voltage to the first power amplifier. Also, the first modulation circuit may include the first discrete-level controller 390 configured to generate a first level control signal ENV_LV1 including multiple pieces of envelope level information based on the first digital envelope signal D_ENV1 received from the outside, and the first switch controller 380 configured to receive the first level control signal ENV_LV1 from the first discrete-level controller 390 and control opening and closing operations of the plurality of switches S1 through SN based on the received first level control signal ENV_LV1. The first modulation circuit may include the first output filter 395 configured to remove noise from the first output voltage VET_APT1 applied to the first power amplifier.

The second modulation circuit may include the second switching regulator 333 that operates together with the multiple output voltage balancer 310 to generate the second output voltage VET_APT2 in the DL-ET mode and operates to generate the second output voltage VET_APT2 in the APT mode, and is configured to supply current to the multiple output voltage balancer 310. The second modulation circuit may include the second switching regulator controller 353 configured to sense output current IHF2 of the multiple output voltage balancer 310 in the DL-ET mode and control the second switching regulator 333 based on a sensing value SV2, and the second switch array 373 including a plurality of switches S1' through SN' respectively corresponding to the plurality of voltages V1 through VN having different levels output from the multiple output voltage balancer 310 and configured to select one of the plurality of voltages V1 through VN having different levels and apply the selected voltage to the second power amplifier. Also, the second modulation circuit may include the second discrete-level controller 393 configured to generate a second level control signal ENV_LV2 including multiple pieces of envelope level information based on the second digital envelope signal D_ENV2 received from the outside, and the second switch controller 383 configured to receive the second level control signal ENV_LV2 from the second discrete-level controller 393 and control opening and closing operations of the plurality of switches S1' through SN' based on the received second level control signal ENV_LV2. The second modulation circuit may include the second output filter 397 configured to remove noise from the second output voltage VET_APT2 applied to the second power amplifier.

For reference, each of the first and second output filters 395 and 397 may include, for example, a low-pass filter. Also, positions of the first and second output filters 395 and 397 may be changed in various ways.

In detail, for example, as shown in FIG. 19, the first output filter 395 may be connected between an output end of the first switching regulator 330 and the first switch array 370, and the second output filter 397 may be connected between an output end of the second switching regulator 333 and the second switch array 373. In this case, the output end of the first switching regulator 330 may be connected between the first switch array 370 and the first output filter 395, and the output end of the second switching regulator 333 may be connected between the second switch array 373 and the second output filter 397.

Also, for example, the first output filter 395 may be connected between the output end of the first switching regulator 330 and the first power amplifier, and the second output filter 397 may be connected between the output end of the second switching regulator 333 and the second power amplifier. In this case, the output end of the first switching regulator 330 may be connected between the first output filter 395 and the first power amplifier, and the output end of the second switching regulator 333 may be connected between the second output filter 397 and the second power amplifier.

Also, for example, the first output filter 395 may be connected between the output end of the first switching regulator 330 and the first switch array 370, and the second output filter 397 may be connected between the output end of the second switching regulator 333 and the second power amplifier. In this case, the output end of the first switching regulator 330 may be connected between the first switch array 370 and the first output filter 395, and the output end of the second switching regulator 333 may be connected between the second output filter 397 and the second power amplifier.

In an embodiment, at least one of the first modulation circuit and the second modulation circuit do not include any output filter.

However, for convenience of explanation, an embodiment of the inventive concept will be described assuming that the first output filter 395 is connected between the output end of the first switching regulator 330 and the first switch array 370, and the second output filter 397 is connected between the output end of the second switching regulator 333 and the second switch array 373.

The main controller 360 may generate the plurality of reference output voltage signals VREF1 through VREFN and may apply any one reference output voltage signal (e.g., VREF1) from among the generated plurality of reference output voltage signals VREF1 through VREFN to the first and second switching regulator controllers 350 and 353. Also, the main controller 360 may determine a tracking mode for each of the first and second power amplifiers. That is, the main controller 360 may set the first and second power amplifiers to have different tracking modes, or may set the first and second power amplifiers to have a same tracking mode. Also, the main controller 360 may control at least one of the first and second switch controllers 380 and 383, the first and second switching regulator controllers 350 and 353, the first and second discrete-level controllers 390 and 393, and the multiple output voltage balancer 310 based on the set tracking mode.

Each component may include a component-dedicated controller (e.g., the first and second switching regulator controller 350 and 353) therein or outside, and each dedicated controller may be controlled by the main controller 360. Also, there may be a controller that integrates and controls at least two components, and the corresponding controller may be controlled by the main controller 360.

As described above, based on the above-described structures and characteristics, the supply modulator 300-2 may be driven in at least one tracking mode of the DL-ET mode and the APT mode to respectively apply the first and second output voltages VET_APT1 and VET_APT2 to the first and second power amplifiers using the same principle as that of the supply modulator 300-1 of FIG. 4.

For reference, the supply modulator 300-2 is shown as including components that are bilaterally symmetrical with respect to the multiple output voltage balancer 310. However, the supply modulator 300-2 of FIG. 19 may include components that are asymmetrical with respect to the multiple output voltage balancer 310. For example, each of a switching regulator, a switching regulator controller, a switch array, a switch controller, a discrete-level controller, and an output filter may be provided by two on the left side, and each of a switching regulator, a switching regulator controller, a switch array, a switch controller, a discrete-level controller, and an output filter may be provided by one on the right side as shown in FIG. 19. However, for convenience of explanation, an embodiment of the inventive concept will be described assuming that the supply modulator 300-2 includes components that are symmetrical with respect to the multiple output voltage balancer 310.

Figure 20:
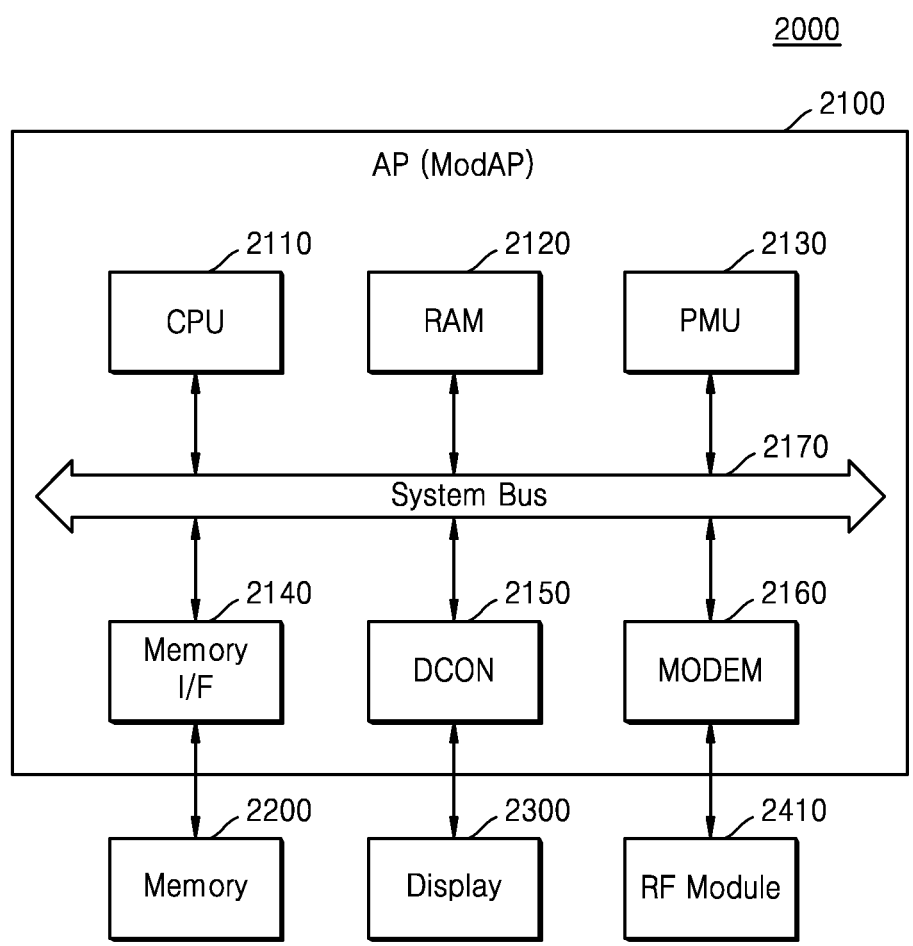
FIG. 20 is a block diagram of a mobile terminal to which a wireless communication apparatus according to an embodiment of the inventive concept is applied.

FIG. 20 is a block diagram of a mobile terminal to which a wireless communication apparatus according to an embodiment of the inventive concept is applied.

Referring to FIG. 20, a mobile terminal 2000 includes an application processor (AP) 2100, a memory 2200, a display 2300, and a RF module 2410. In addition, the mobile terminal 2000 may further include various components such as a lens, a sensor, and an audio module.

The AP 2100 may be implemented as a system-on-a-chip (SoC), and may include a central processing unit (CPU) 2110, a random-access memory (RAM) 2120, a power management unit (PMU) 2130, a memory interface (I/F) 2140, a display controller (DCON) 2150, a modem 2160, and a system bus 2170. The AP 2100 may support various internet protocols (IP). The AP 2100 may be referred to as a ModAP when a function of a modem chip is integrated therein.

The CPU 2110 may control all operations of the AP 2100 and the mobile terminal 2000. The CPU 2110 may control an operation of each component of the AP 2100. Also, the CPU 2110 may be implemented as a multi-core. The multi-core is a computing component with two or more independent cores.

The RAM 2120 may temporarily store programs, data, or instructions. For example, programs and/or data stored in the memory 2200 may be temporarily stored in the RAM 2120 according to a control of the CPU 2110 or a booting code. The RAM may be implemented as a dynamic RAM (DRAM) or a static RAM (SRAM).

The PMU 2130 may manage power of each component of the AP 2100. The PMU 2130 may also determine an operation state of each component of the AP 2100 and control the operation.

The memory I/F 2140 may control all operations of the memory 2200, and may control data exchange between each component of the AP 2100 and the memory 2200. The memory I/F 2140 may write data to the memory 2200 or read data from the memory 2200 according to a request of the CPU 2110.

The DCON 2150 may transmit image data to be displayed on the display 2300 to the display 2300. The display 2300 may be implemented as a flat panel display or a flexible display such as a liquid crystal display (LCD) or an organic light-emitting diode (OLED).

For wireless communication, the modem 2160 may modulate data to be transmitted appropriately for a wireless environment, and may reconstruct received data. The modem 2160 may perform digital communication with the RF module 2410.

For reference, the modem 100 described with reference to FIGS. 1 through 3 may be implemented in the modem 2160.

The RF module 2410 may convert a high-frequency signal into a low-frequency signal and may transmit the low-frequency signal to the modem 2160 through an antenna. Also, the RF module 2410 may convert the low-frequency signal received from the modem 2160 into the high-frequency signal and may transmit the high-frequency signal to the outside of the mobile terminal 2000 through an antenna. Also, the RF module 2410 may amplify or filter a signal.

For reference, the RFIC 200, the supply modulator 300, the power amplifier PA, the duplexer 400, and the antenna ANT described with reference to FIGS. 1 through 3 may be implemented in the RF module 2410. Accordingly, the supply modulators 300-1 and 300-2 described with reference to FIGS. 4 through 19 may also be implemented in the RF module 2410.

The mobile terminal 2000 provides broadband communication and may consume less power during communication due to its supply modulator.

While the inventive concept has been particularly shown and described with reference to embodiments thereof, it will be understood that various changes in form and details may be made therein without departing from the spirit and scope of the following claims.

What is claimed is:

1. A supply modulator driven to apply an output voltage to a power amplifier, the supply modulator comprising:
   a switching regulator operating to generate the output voltage in a discrete level envelope tracking mode or an average power tracking mode;
   a multiple output voltage balancer operating together with the switching regulator to generate the output voltage without receiving a power supply from an outside power source in the discrete level envelope tracking mode, and configured to equally adjust a difference between a plurality of voltages having different levels based on current received from the switching regulator and output the plurality of voltages having different levels of which the difference is equally adjusted;
   a switching regulator controller configured to sense output current of the multiple output voltage balancer in the discrete level envelope tracking mode to generate a sensing value, and control the switching regulator based on the sensing value;

a switch array comprising a plurality of switches respectively corresponding to the plurality of voltages having different levels output from the multiple output voltage balancer, and configured to select one of the plurality of voltages having different levels and apply the selected voltage to the power amplifier;

a discrete-level controller configured to generate a level control signal based on a digital envelope signal received from outside;

a switch controller configured to receive the level control signal from the discrete-level controller, and control opening and closing operations of the plurality of switches, based on the received level control signal; and a main controller configured to select one of the average power tracking mode and the discrete level envelope tracking mode, and control at least one of the multiple output voltage balancer, the switch controller, the switching regulator controller, and the discrete-level controller, based on the selected tracking mode.

2. The supply modulator of claim 1, wherein the switching regulator controller comprises:

a feedback loop configured to sense the output current of the multiple output voltage balancer to generating the sensing value;

an operational transconductance amplifier (OTA) configured to compare any one of the plurality of voltages having different levels output from the multiple output voltage balancer with a reference output voltage signal to output a difference value;

a summer configured to sum the difference value output from the OTA and the sensing value to generate a summed value and output the summed value as a compensation value;

a compensation comparator configured to compare the compensation value output from the summer with a reference value;

a digital-to-analog converter configured to convert an average power signal received from outside into a reference voltage signal;

an output comparator configured to compare the reference voltage signal from the digital-to-analog converter with the output voltage; and a multiplexer configured to output one of outputs of the compensation comparator and the output comparator to the switching regulator as a switching regulator control signal.

3. The supply modulator of claim 2, wherein, when the selected tracking mode is the discrete level envelope tracking mode, the multiplexer is further configured to output the output of the compensation comparator to the switching regulator as the switching regulator control signal.

4. The supply modulator of claim 2, wherein, when the selected tracking mode is the average power tracking mode, the multiplexer is further configured to output the output of the output comparator to the switching regulator as the switching regulator control signal.

5. The supply modulator of claim 2, wherein, in the discrete level envelope tracking mode, sum current of output current of the switching regulator and the output current of the multiple output voltage balancer is supplied to the power amplifier, wherein the output current of the switching regulator is controlled based on the switching regulator control signal, such that an average of the output current of the multiple output voltage balancer is approximately 0.

6. The supply modulator of claim 5, wherein the output current of the switching regulator comprises current of a low-frequency component, and the output current of the multiple output voltage balancer comprises current of a high-frequency component.

7. The supply modulator of claim 1, wherein the multiple output voltage balancer comprises:

a plurality of load capacitors each corresponding to a difference between the plurality of voltages having different levels;

a plurality of balance switch sets corresponding to the plurality of load capacitors; and a plurality of flying capacitors configured to adjust balance of voltages applied to the plurality of load capacitors along with the plurality of balance switch sets, wherein each of the plurality of balance switch sets comprises a pair of balance switches that are alternately turned on and turned off.

8. The supply modulator of claim 7, wherein, in the average power tracking mode, the switch controller is further configured to control at least one of the plurality of switches and connect a corresponding load capacitor from among the plurality of load capacitors to the power amplifier.

9. The supply modulator of claim 1, further comprising an output filter configured to remove noise from the output voltage applied to the power amplifier.

10. The supply modulator of claim 9, wherein an output end of the switching regulator is connected between the switch array and the output filter.

11. The supply modulator of claim 9, wherein an output end of the switching regulator is connected between the output filter and the power amplifier.

12. The supply modulator of claim 9, wherein the output filter comprises a low-pass filter.

13. A supply modulator driven to respectively apply first and second output voltages to first and second power amplifiers, the supply modulator comprising:

a multiple output voltage balancer operating to generate the first or second output voltage without receiving a power supply from an outside power source in a discrete level envelope tracking mode, and configured to equally adjust a difference between a plurality of voltages having different levels and output the plurality of voltages having different levels of which the difference is equally adjusted;

a first modulation circuit comprising a first switching regulator operating together with the multiple output voltage balancer to generate the first output voltage in the discrete level envelope tracking mode and operating to generate the first output voltage in an average power tracking mode, and configured to supply current to the multiple output voltage balancer, a first switching regulator controller configured to sense output current of the multiple output voltage balancer in the discrete level envelope tracking mode to generate a first sensing value and control the first switching regulator based on the first sensing value, a first switch array comprising a plurality of switches respectively corresponding to the plurality of voltages having different levels output from the multiple output voltage balancer and configured to select one of the plurality of voltages having different levels and apply the selected voltage to the first power amplifier, a first discrete-level controller configured to generate a first level control signal based on a first digital envelope signal received from outside, and a first switch controller configured to receive the first level control signal from the first discrete-level controller and control opening and closing operations of the plurality of switches, based on the received first level control signal;

a second modulation circuit comprising a second switching regulator operating together with the multiple output voltage balancer to generate the second output voltage in the discrete level envelope tracking mode and operating to generate the second output voltage in the average power tracking mode, and configured to supply current to the multiple output voltage balancer, a second switching regulator controller configured to sense output current of the multiple output voltage balancer in the discrete level envelope tracking mode to generate a second sensing value and control the second switching regulator based on the second sensing value, a second switch array comprising a plurality of switches respectively corresponding to the plurality of voltages having different levels output from the multiple output voltage balancer and configured to select one of the plurality of voltages having different levels and apply the selected voltage to the second power amplifier, a second discrete-level controller configured to generate a second level control signal comprising multiple pieces of envelope level information, based on a second digital envelope signal received from outside, and a second switch controller configured to receive the second level control signal from the second discrete-level controller and control opening and closing operations of the plurality of switches, based on the received second level control signal; and a main controller configured to select one of the average power tracking mode and the discrete level envelope tracking mode for each of the first and second power amplifiers, and control at least one of the first and second switching regulator controllers, the first and second switch controllers, the first and second discrete-level controllers, and the multiple output voltage balancer, based on the selected tracking mode.

14. The supply modulator of claim 13, wherein the multiple output voltage balancer comprises:
a plurality of load capacitors each corresponding to a difference between the plurality of voltages having different levels;
a plurality of balance switch sets corresponding to the plurality of load capacitors; and
a plurality of flying capacitors configured to adjust balance of voltages applied to the plurality of load capacitors along with the plurality of balance switch sets,
wherein each of the plurality of balance switch sets comprises a pair of balance switches that are alternately turned on and turned off.

15. The supply modulator of claim 13, further comprising:
a first output filter configured to remove noise from the first output voltage applied to the first power amplifier; and
a second output filter configured to remove noise from the second output voltage applied to the second power amplifier.

16. The supply modulator of claim 15, wherein an output end of the first switching regulator is connected between the first switch array and the first output filter, and
an output end of the second switching regulator is connected between the second switch array and the second output filter.

17. The supply modulator of claim 15, wherein an output end of the first switching regulator is connected between the first output filter and the first power amplifier, and
an output end of the second switching regulator is connected between the second output filter and the second power amplifier.

18. A supply modulator comprising:
a switching regulator configured to output a modulation voltage based on a control signal;
a multiple output voltage balancer configured to equally adjust a difference between a plurality of voltages having different levels based on a current received from the switching regulator and output the plurality of voltages having different levels of which the difference is equally adjusted;
an operational transconductance amplifier outputting a difference value by comparing one of the output voltages with a reference voltage;
a summer summing the difference value and a sensing value generated from sensing an output current of the multiple output voltage balancer to generate a compensation value;
a compensation comparator receiving the compensation value;
an output comparator comparing the modulation voltage with an average power signal from a modem; and
a multiplexer configured to provide an output of the output comparator as the control signal in an average power tracking (APT) mode, and provide an output of the compensation comparator as the control signal in a discrete level envelope signal (DL-ET) mode.

19. The supply modulator of claim 18, further comprising a switch array connected between an output of the multiple output voltage balancer and a node, an output of the switching regulator is connected to the node, and the switch array provides only one of the output voltages to the node.

20. The supply modulator of claim 18, further comprising a wire connecting the node to an input of the summer.

* * * * *